(12) United States Patent
Dayan et al.

(10) Patent No.: US 11,860,844 B2
(45) Date of Patent: Jan. 2, 2024

(54) MANAGING A LSM TREE OF KEY VALUE PAIRS THAT IS STORED IN A NON-VOLATILE MEMORY

(71) Applicant: Pliops Ltd., Tel Aviv (IL)

(72) Inventors: Niv Dayan, Tel Aviv (IL); Moshe Twitto, Givat Shemuel (IL)

(73) Assignee: PLIOPS LTD., Tel Aviv (IL)

( * ) Notice: Subject to any disclaimer, the term of this patent is extended or adjusted under 35 U.S.C. 154(b) by 506 days.

(21) Appl. No.: 17/081,986

(22) Filed: Oct. 27, 2020

(65) Prior Publication Data

US 2022/0075765 A1   Mar. 10, 2022

Related U.S. Application Data

(60) Provisional application No. 63/075,284, filed on Sep. 7, 2020.

(51) Int. Cl.
| | |
|---|---|
| G06F 16/00 | (2019.01) |
| G06F 16/22 | (2019.01) |
| G06F 16/21 | (2019.01) |
| G06F 13/16 | (2006.01) |
| G06F 16/2455 | (2019.01) |
| G06F 16/2453 | (2019.01) |

(52) U.S. Cl.
CPC ...... G06F 16/2246 (2019.01); G06F 13/1668 (2013.01); G06F 16/217 (2019.01); G06F 16/24539 (2019.01); G06F 16/24568 (2019.01)

(58) Field of Classification Search
CPC ............. G06F 16/2246; G06F 13/1668; G06F 16/217; G06F 16/24539; G06F 16/24568
See application file for complete search history.

(56) References Cited

U.S. PATENT DOCUMENTS

| | | | |
|---|---|---|---|
| 2015/0120706 A1* | 4/2015 | Hoffman | G06F 16/951 707/722 |
| 2020/0372004 A1* | 11/2020 | Barber | G06F 16/213 |
| 2021/0279205 A1* | 9/2021 | Irazabal | G06F 16/152 |

* cited by examiner

*Primary Examiner* — Paul Kim
(74) *Attorney, Agent, or Firm* — Reches Patents

(57) ABSTRACT

A method for managing a log structured merged (LSM) tree of key value (KV) pairs, the LSM tree is stored in a non-volatile memory, the method may include merging runs of the LSM tree to provide merged runs; writing merged runs to the non-volatile memory; adding new runs to the LSM tree, wherein the adding comprises writing runs to the non-volatile memory; and updating at least one management data structure (MDS) to reflect the merging and the adding; wherein an MDS of the at least one MDS stores a mapping between keys of the KV pairs of the LSM tree, fingerprints associated with the KV pairs of the LSM tree, and compressed run identifiers that identify runs of the LSM tree.

23 Claims, 22 Drawing Sheets

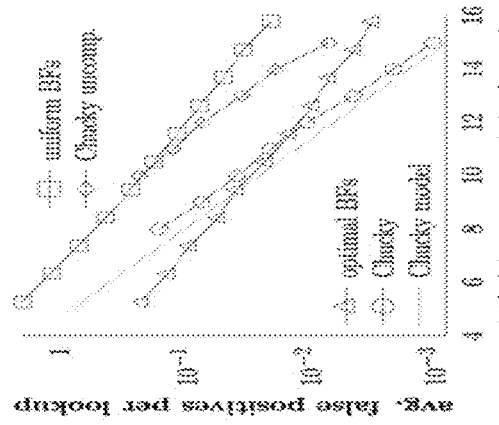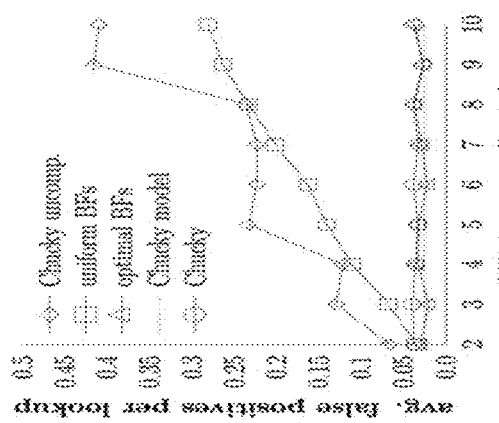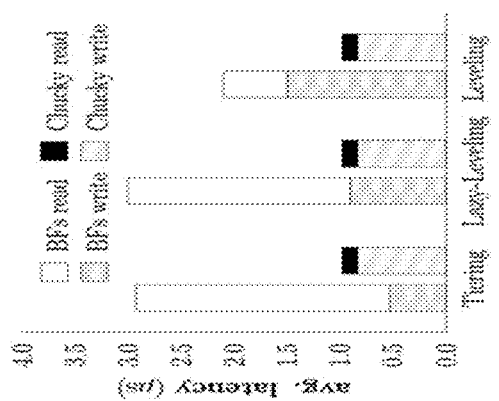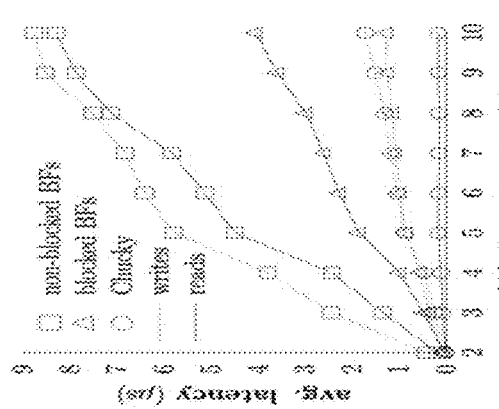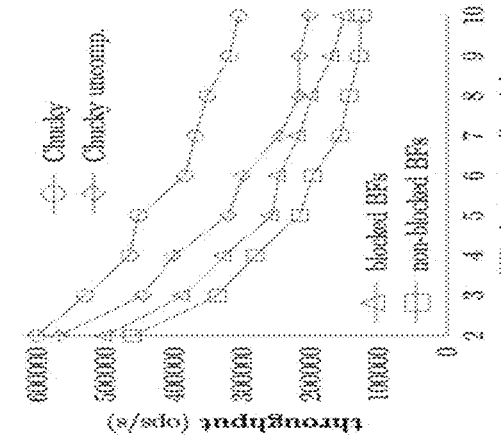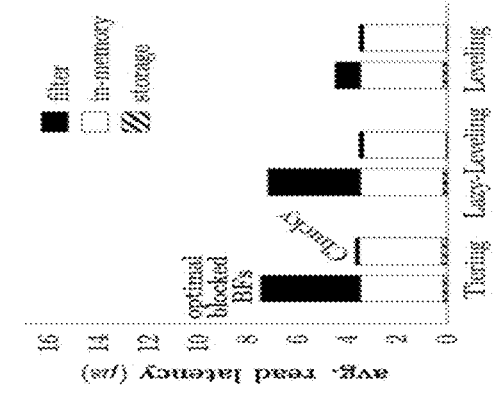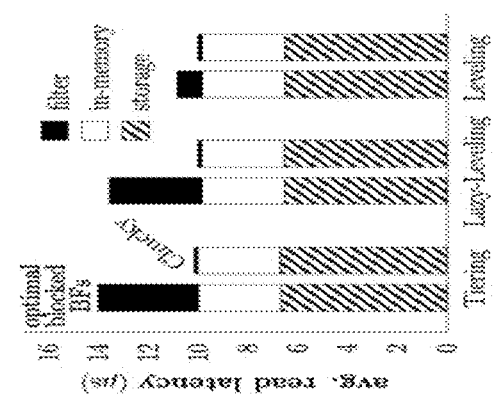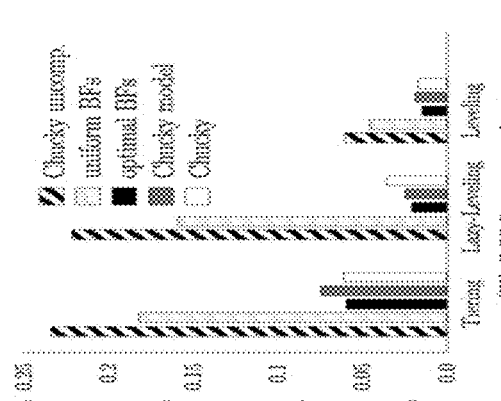
FIG. 12A  FIG. 12B  FIG. 12C  FIG. 12D
FIG. 12E  FIG. 12F  FIG. 12G  FIG. 12H

MANAGING A LSM TREE OF KEY VALUE PAIRS THAT IS STORED IN A NON-VOLATILE MEMORY

CROSS REFERENCE

This application claims priority from U.S. provisional patent 63/075,284 filing date Sep. 7, 2020 which is incorporated herein by reference.

BACKGROUND

Modern key-value stores (KV-stores) rely on an LSM-tree to persist data in storage. An LSM-tree optimizes application writes by buffering them in memory, flushing the buffer to storage as a sorted run whenever it fills up, and sort-merging runs across a logarithmic number of levels. To optimize application point reads, there is an in-memory Bloom filter for each run to allow ruling out runs that do not contain a target entry. Such designs are used in OLTP, HTAP, social graphs, block-chain, etc.

The LSM-tree was originally designed for hard disk drives, which are 5-6 orders of magnitude slower than DRAM memory chips. The advent of SSDs, however, has shrunk the performance difference between storage and memory access to 2-3 orders of magnitude. Today, a memory I/O takes 100 ns while an SSD read I/O (e.g., on Intel Optane) takes 10 microseconds.

KV-SSDs are exacerbating this trend by embedding the KV-store logic within the SSD and thereby eliminating bus latency (on SATA or PCEs) from storage I/O.

Hence, memory access is no longer negligible relative to storage access. This is driving a need to revise data structure architectures to eliminate creeping memory bandwidth bottlenecks.

KV-SSDs represent the KV pairs by multiple data structures that are known as Bloom Filters (BFs).

It has been found that the BFs in modern KV-stores are emerging as a memory I/O bottleneck. Consider first LSM-tree designs that optimize for writes by merging lazily and thus having tens to hundreds of runs present in the system. For such designs, probing each BF at a cost of 100 ns can approach and even exceed the latency of the SSD I/O(s), which fetch the target entry from storage.

This overhead grows with data size as the number of runs and thus the number of BFs in the system increases.

As the data grows, this overhead increases as there are more runs and thus more BFs in the system.

Moreover, many application workloads exhibit skew such that the most sought after entries reside in a block cache in memory. Locating an entry in this cache still entails traversing potentially all the BFs to first identify the run (and then the data block within it) that contains the target entry. As there are no storage I/Os in this case, memory I/Os for probing the BFs become the bottleneck.

A naive solution is tuning the LSM-tree to merge more greedily so that there are fewer runs and thus fewer BFs to probe. However, increasing merge greediness also increases storage write I/Os, which can outweigh the benefit of saving BF probes. Moreover, tuning up merge greediness also increases the BFs' construction cost, which can account for over 70% of merge overheads. A BF is immutable and has to be rebuilt from scratch during every merge operation. Thus, merging runs more greedily also entails reconstructing BFs more greedily.

BFs make it impossible to mitigate probe cost and construction cost at the same time. In fact, both of these costs grow with data size thus leaving the application with worsening trade-offs to choose from.

Over the past decade, a new family of data structures has emerged as an alternative to Bloom filter. They operate by storing a fingerprint for every data item in a compact hash table. We refer to them as Fingerprint Filters (FFs), and they include Quotient filter, Cuckoo filter, and others. Their promise is that they support storing auxiliary and updatable information for each entry alongside its fingerprint. Hence, it is possible to replace an LSM-tree's multiple BFs by one updatable FF that maps each data entry to a fingerprint and an auxiliary run identifier (also referred to as run ID or RUNID). During an application read, the fingerprints match or dismiss the target key while the run IDs direct which run to search for every fingerprint match.

Hence, an FF requires far fewer memory I/Os than BFs to find a given entry's run.

An FF allows finding an entry's target run with a practically constant number of memory I/Os, unlike BFs which require numerous memory I/Os.

As FFs enable probing in constant access time, they promise to replace memory I/Os across numerous BFs by a constant Scaling False Positives & Updates There are two challenges in harnessing an FF for LSM-tree filtering.

First, the false positive rate (FPR) for an FF does not scale well.

This is due to the run IDs, which must grow with data size to identify more runs uniquely.

Assuming a fixed memory budget, the run IDs must "steal" bits from the fingerprints as data grows. This increases the FPR and results in more storage I/Os.

A second challenge is efficiently keeping the run IDs within the FF up-to-date. A possible solution is to issue a read to storage to check if an entry exists before the write and, if so, to update its run ID.

However, the extra read I/O to storage is expensive. In summary, existing designs based on FF do not scale storage I/Os, while designs based on BFs do not scale memory I/Os.

BRIEF DESCRIPTION OF THE DRAWINGS

The embodiments of the disclosure will be understood and appreciated more fully from the following detailed description, taken in conjunction with the drawings in which:

FIGS. 12A-12H illustrates a comparison between the performance of Chucky and other methods;

DESCRIPTION OF EXAMPLE EMBODIMENTS

Figure 1:
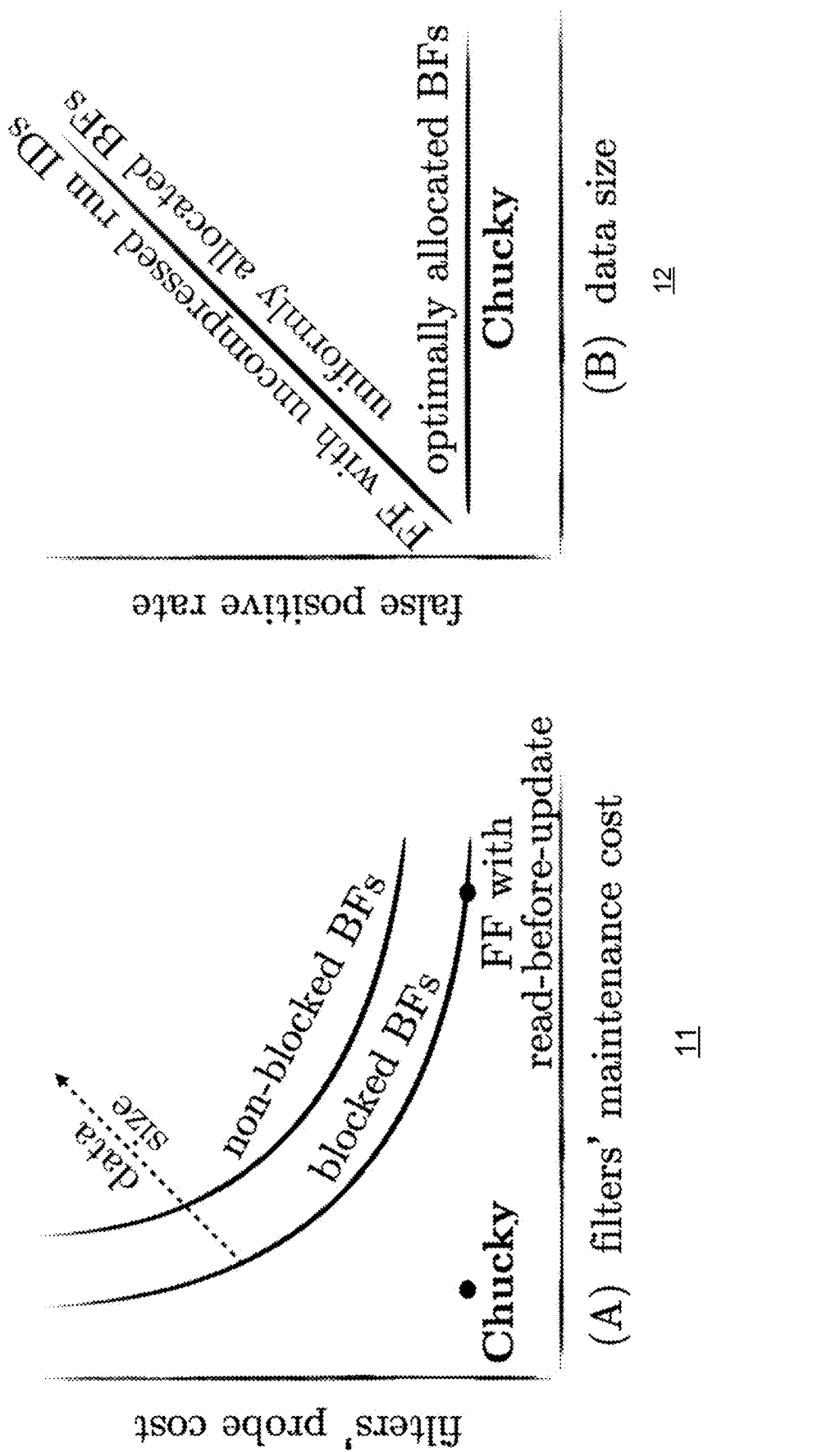
FIG. 1 illustrates examples of maintenance cost and data size.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The terms compressing and encoding are used in an interchangeable manner.

The a fingerprint filter (FF) is an example of a management data structure (MDS) that may store fingerprints and run IDs.

There may be provided a method, a system, and a computer readable medium for managing LSM-trees stored in a non-volatile memory such as an SSD memory, in an efficient manner.

There may be provided a method that scales false positive rate for fingerprints in a proper manner.

There is provided a method that efficiently keeps the run IDs within the FF up-to-date. For example—even without the extra read to storage to check if an entry exists before the write and, if so, to update its run ID.

There may be provided a combination of both methods.

For simplicity of explanation most of the following text will refer to a solution. An example of the solution is referred to as Chucky—Huffman Coded Key-Value Store. It should be noted that the Huffman coding may be replaced by another variable length code.

To scale false positives, it was found that the run IDs are extremely compressible. The reason is that their distribution is approximately geometric, meaning that entries with run IDs of larger levels are exponentially more common than entries with run IDs of smaller levels. This allows encoding larger runs with fewer bits and smaller runs with more bits. The saved space can be dedicated to the fingerprints to keep them large as the data grows.

For scaling updates, it has been found that that the run IDs can be opportunistically updated during merge operations while the target entries are brought to memory. Hence, we can keep the run IDs up-to-date without introducing any additional storage I/Os.

Chucky has been found to scale memory and storage I/Os at the same time. It achieves this by replacing the BFs by a single FF with compressed run IDs that are updated during merge operations.

The following text will illustrate examples for run ID compression using Huffman coding, while identifying and addressing the resulting challenges: (1) how to align fingerprints and compressed run IDs within the FF's buckets, and (2) how to encode and decode run IDs efficiently.

Chucky may use the bits saved through compression to keep the fingerprints large and to thereby guarantee a scalable false positive rate as the data grows.

Chucky can fit with any FF, and only for example there is illustrated how to tailor Chucky to a FF such as a Cuckoo filter.

In the specification it is shown how to replace the BFs by an FF with auxiliary run IDs that are kept up-to-date opportunistically while merging. The Run ID is auxiliary in the sense that it include both run ID and fingerprints.

In the specification it is shown that run IDs are extremely compressible, and we study how to minimize their size using Huffman coding.

In the specification it is shown how to align compressed run IDs and fingerprints within FF buckets to achieve good space utilization.

In the specification it is shown how to encode and decode run IDs efficiently.

In the specification it is shown how to integrate Chucky with Cuckoo filter.

In the specification it is shown experimentally that Chucky scales in terms of memory I/Os and storage I/Os at the same time.

FIG. 1 includes graphs 11 and 12 that illustrate a comparison between the performance of Chucky versus prior art solutions.

The specification illustrates that the Run IDs are extremely compressible by analyzing their information theoretical entropy, and that we can further reduce entropy and thus enable more compressibility by sorting a series of Run IDs and assigning them a single code The specification illustrates a compression variant called Multinomial Huffman that assigns a Huffman code to a bucket based on the probability of a given combination of run IDs coinciding in the bucket.

In the specification it is shown that compressed Run IDs introduce the problem of bucket overflows, and we introduce two techniques to address it, namely Variable Minimally Bounded Fingerprints and a Leftover Huffman, an approach that assigns codes based on the leftover space in the bucket after the fingerprints.

In the specification it is shown how to support updates of duplicate entries to the LSM-tree without causing infinite recursion chains in the Cuckoo filter.

Chucky can be generalized across a number of widely used LSM-tree designs suited for different application workloads.

In the specification it is shown how to recover the Cuckoo filter after power failure.

An LSM-Tree consists of multiple levels of exponentially increasing capacities. Level 0 is an in-memory buffer (and/or in a first layer of the storage) while all other levels are in storage. The application inserts key-value pairs into the buffer. When the buffer reaches capacity, its contents get flushed as a sorted array called a run into Level 1 in storage.

There are various merging policies that can be implemented. The first one is referred to a sequential merging in which whenever a given Level i reaches capacity, its runs get merged into Level i+1. The level i+1 then may replace the i level—and may be treated as a modified i level.

To merge runs, their entries are brought from storage to memory to be sort-merged and then written back to storage as a new run. The number of levels L is $\log_T(N)$, where T is the capacity ratio between any two adjacent levels and N is the ratio between the overall data size and the in-memory buffer's size.

Another merging policy may be referred to as a multiple level merging includes merging runs of multiple levels at once. This may occur for various reasons for—example—when predicting that a certain merger will lead a certain level to be almost filled. This merging policy may be referred to as predictive merging.

Figure Table 0 provides an example of different lists terms used to describe LSM-tree throughout the paper. These terms are:

TABLE 0

| Term | Definition |
| --- | --- |
| L | Number of LSM-tree levels |
| T | LSM-tree size ratio |
| N | Data size to buffer size ratio |
| K | merge triggering threshold for Levels 1 to |
| Z | merge triggering threshold for Level |
| H | Bloom filter hash functions num. |
| R | Expected point read I/O cost |
| M | filtering memory budget |

Updates and deletes are performed out-of-place by inserting a key-value entry with the updated value into the buffer (for a delete, the value is a tombstone). Whenever two runs get merged while containing two entries with the same key, the older entry is discarded as the newer entry supersedes it. In order to always find the most recent version of an entry, an application read traverses the runs from youngest to oldest across the levels and terminates when it finds the first entry with a matching key. If its value is a tombstone, the read returns a negative result to the application. For every run in storage, there is an array of fence pointers in memory that contains the min/max key at every data block and thereby allows finding the relevant block within a run with one storage I/O.

Figure 2:
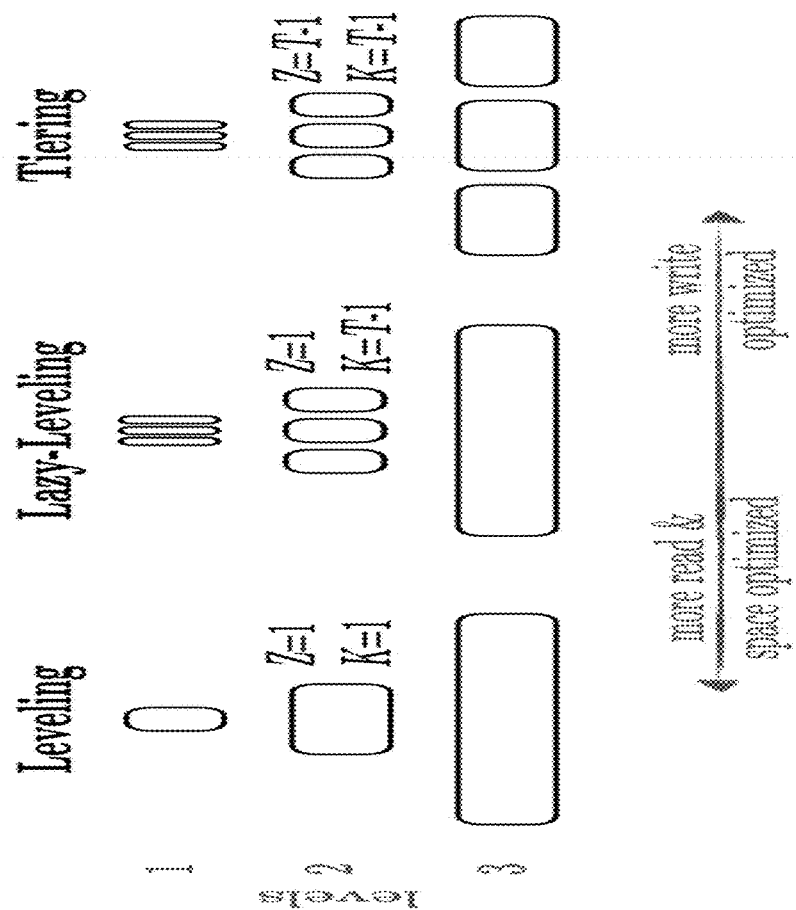
FIG. 2 illustrates an example of LSM tree variants.

The LSM-tree design space spans many variants that favor different application workloads. The most common two are Leveling and Tiering (used by default in RocksDB and Cassandra, respectively). This is illustrated in FIG. 2.

With Leveling, merging is performed greedily within each level (i.e., as soon as a new run comes in). As a result, there is at most one run per level and every entry gets merged on average about T/2 times within each level.

With Tiering, merging is performed lazily within each level (i.e., only when the level fills up). As a result, there are at most about T runs per level and every entry gets merged once across each of the levels.

Leveling is more read and space optimized while Tiering is more write-optimized. The size ratio T can be varied to fine-tune this trade-off.

FIG. 2 also illustrates Lazy-Leveling, a hybrid that uses Leveling at the largest level and Tiering at all smaller levels to offer favorable trade-offs in-between (i.e., for space-sensitive write-heavy applications with mostly point reads).

The recent Dostoevsky framework generalizes these three variants using two parameters: (1) a threshold Z for the number of runs at the largest level before a merge is triggered, and (2) a threshold K for the number of runs at each of the smaller levels before a merge is triggered.

FIG. 2 and tables 1 and 2 show how to set these parameters to assume each of the three designs.

TABLE 1

| | Blocked bloom filters memory I/O | | |
| --- | --- | --- | --- |
| | Leveling | Lazy-leveling | Tiering |
| Probe cost | O(L) | O(L − T) | O(L − T) |
| Construction cost | O(L − T) | O(L + T) | O(L) |

TABLE 2

| | Bloom Filters false positive rate complexities | | |
|---|---|---|---|
| | Leveling | Lazy-leveling | Tiering |
| Uniform | $O(2^{-M*ln(2)} * L)$ | $O(2^{-M*ln(2)} * L*T)$ | $O(2^{-M*ln(2)} * L*T)$ |
| Optimal | $O(2^{-M*ln(2)})$ | $O(2^{-M*ln(2)})$ | $O(2^{-M*ln(2)} * T)$ |

See, for example equation (1) that denotes A_i as the maximum number of runs at Level i and A as the maximum number of runs in the system with respect to these parameters.

$Ai=K$ for $i$ between 1 and $L$, for any other value of $i$
$Ai=Z$.

$$A = \text{SUM (for } i \text{ between 1 and } L \text{) of } Ai = (L-1)*k+z. \quad (1)$$

Chucky can be built, for example, on top of Dostoevsky to be able to span multiple LSM-tree variants that can accommodate diverse workload.

While some designs such as HBase and Cassandra merge entire runs at a time, others such as RocksDB partition each run into multiple files called Sorted String Tables (SSTs) and merge at the granularity of SSTs. This grants finer control of how merge overheads are scheduled in space and time, though it increases write-amplification. For ease of exposition, the specification illustrates merging as though it occurs at the granularity of runs, though this work is also applicable to designs that rely on SSTs for merging.

We use RocksDB's dynamic level size adaptation technique that sets the capacities of Levels 1 to L−1 based on the number of entries at the largest level in order to restrict storage space-amplification.

We assume preemptive merging, whereby we detect when Levels 1 to i are near capacity and merge their runs all at once as opposed to having the merge recursively trickling across the levels and resulting in more write-amplification.

Bloom filters Each run in the LSM-tree has a corresponding in-memory Bloom filter (BF), which is a space-efficient probabilistic data structure used to test whether a key is a member of a set. All Bloom filters are persisted in storage to be recoverable in case of system failure. A BF is an array of bits with h hash functions. For every key inserted, we map it using each of the hash functions to h random bits, setting them from 0 to 1 or keeping them set to 1. Checking for the existence of a key requires examining its h bits. If any are set to 0, we have a negative. If all are set to 1, we have either a true or false positive. The false positive rate (FPR) is $2^{\wedge}(-M*ln(2))$, where M is the number of bits per entry.

As we increase M, the probability of bit collisions decreases and so the FPR drops. In KV-stores in industry (e.g., RocksDB), the number of bits per entry is typically set to ten.

A BF does not support deletes (i.e., by resetting bits back to 0) as this could lead to false negatives. For this reason, a new BF is created from scratch for a new run as a result of a merge.

A BF entails h memory I/Os for an insertion as well as for a positive query. For a negative query, it entails on average two memory I/Os since about 50% of the bits are set to zero and so the expected number of bits checked before incurring a zero is two.

To optimize memory I/Os has been proposed as an array of contiguous BFs, each the size of a cache line. A key is inserted by first hashing it to one of the constituent BFs and then inserting the key into it. This entails only one memory I/O for any insertion or query. The trade-off is a slight FPR increase.

RocksDB recently switched from standard to blocked BFs. We use both approaches as baselines in this paper, and we focus more on blocked BFs as they are the tougher competition.

For an LSM-tree with blocked BFs, an application query costs at most $O(K*(L-1)+Z)$ memory I/Os (i.e., one to the filter of each run).

On the other hand, an application update costs $O(T/K*(L-1)+T/Z)$ amortized memory I/Os (the average number of times an entry gets merged and thus inserted into a new BF).

Table 1 summarizes these costs for each of the LSM-tree variants.

We observe that both cost metrics increase with respect to the number of levels L and thus with the data size.

Second, we observe an inverse relationship between these metrics: the greedier we set the LSM-tree's merging to be (i.e., either by changing merge policy or by fine-tuning the size ratio), probe cost decreases as there are fewer BFs while construction cost increases as the BFs get rebuilt more greedily.

Hence, it is impossible to improve on one of these metrics without degrading the other. FIG. 1 conceptually illustrates this relationship.

KV-stores in industry set a uniform number of bits per entry to BFs at all levels.

This approach, however, was recently identified as suboptimal.

The optimal approach is to reallocate about 1 bit per entry from the largest level and to use it to assign linearly more bits per entry to filters at smaller levels.

While this slightly increases the largest level's FPR, it exponentially decreases the FPRs at smaller levels such that the overall sum of FPRs is smaller.

Equations 2 and 3 express the FSR with both approaches:

$$FPR_{uniform} = 2^{-M*ln(2)} * (K*(l-1) + Z) \quad (2)$$

$$FPR_{optimal} = 2^{-M*ln(2)} * Z^{\frac{T-1}{T}} * K^{\frac{1}{T}} * \frac{T^{\frac{T-1}{T}}}{T-1} \quad (3)$$

The intuition for Equation (2) is that as the data grows, the FPR increases as there are more runs and thus more BFs across which false positives can occur.

On the other hand, Equation (3) states that with the optimal approach, the relationship between memory and FPR is independent of the number of levels and thus of data size. The reason is that as the LSM-tree grows, smaller levels are assigned exponentially smaller FPRs thus causing the sum of FPRs to converge.

We summarize the corresponding FPR complexities in Table 2 and visualize them conceptually in FIG. 1.

While our primary goal is to improve on the BFs' memory bandwidth, we must also at least match the FPR scalability with the optimal BF approach to be competitive across all performance fronts.

Fingerprint Filters (FFs) are a family of data structures that have recently emerged as an alternative to Bloom filter. At its core, an FF is a compact hash table that stores fingerprints of keys, where a fingerprint is a string of F bits derived by hashing a key. To test for set membership, FF hashes a key in question to a bucket and compares its fingerprint to all fingerprints in the bucket. If there is a match, we have a positive. An FF cannot return a false negative, and it returns a false positive with a probability of at least $2^{-F}$.

The fingerprint size F controls a trade-off between accuracy and space. The various FFs that have been proposed differ in their collision resolution methods, which swap entries across buckets to resolve collisions. For example, Cuckoo filter uses a variant of Cuckoo hashing while Quotient filter cite, uses a variant of linear probing.

While different collision resolution methods give different FFs nuanced performance and space properties, all FFs to date share a common set of desirable properties with respect to our problem. First, they support queries and updates in practically constant time for a similar memory footprint to Bloom filters. Second, unlike Bloom filters, FFs support storing updatable auxiliary data for each entry alongside its fingerprint. These capabilities allows to replace an LSM-tree's multiple Bloom filters with a single FF that maps from data entries to the runs in which they reside in the LSM-tree. Such a design promises to allow finding an entry's target run with a small and constant number of memory I/Os, unlike Bloom filters which require at least one memory I/O across numerous filters.

Despite this promise, two challenges arise with this approach. The first is how to keep the run IDs up-to-date as entries get merged across the LSM-tree. The second is how to keep the size of the run IDs modest as the data size grows.

Case-Study The recent SlimDB system is the first to integrate LSM-tree with an FF. As such, it provides an interesting case-study and baseline with respect to meeting the above two challenges.

To keep the run IDs within the FF up-to-date, SlimDB performs a read I/O to storage for each application update to check if the entry exists and if so to update its run ID within the FF. This involves a substantial overhead in terms of storage I/Os, specifically for applications that perform blind writes.

Second, SlimDB represents the run IDs using binary encoding. Each run ID therefore comprises $\log_2(K*(L-1)+Z)$ bits to identify all runs uniquely. Hence, more bits are needed as the number of levels L grows. This is not a problem for SlimDB as it is designed for systems with a less constrained memory budget. In fact, SlimDB uses additional memory to prevent false positives altogether by storing the full keys of colliding fingerprints in memory. SlimDB also proposes a novel fence pointers format.

In contrast, we focus on applications with a tighter budget of M bits per entry, where M is a non-increasing small constant.

Under this constraint, Equation (4) denotes the FPR over a single entry with respect to the number of bits per entry M and the run ID size D.

$$Fpr > 2^{-F} = 2^{-M+D} \qquad (4)$$

By plugging the run ID size for D, the lower bound simplifies to $2^{-M}*(K*(L-1)+Z)$, meaning the FPR increases with the number of levels as the run IDs steal bits from the fingerprints.

Chucky is an LSM-based KV-store that scales memory and storage I/Os at the same time. It achieves this by replacing the Bloom filters with a fingerprint filter and innovating along two areas.

Chucky keeps the run IDs within the FF up-to-date opportunistically during merge operations at no additional storage I/O cost. Moreover, it allows run IDs to be inherited across merge operations to obviate FF updates and thereby reduce memory I/Os. In this way, Chucky both scales and decouples the costs of updating and querying the FF, as shown in FIG. 1.

Chucky may compress run IDs to prevent their size from increasing and taking bits from the fingerprints as the data grows. Thus, Chucky scales the FPR and thereby storage I/Os as shown in FIG. 1.

For both generality and ease of exposition, we abstract the details of the FF's collision resolution method for now.

Figure 3:
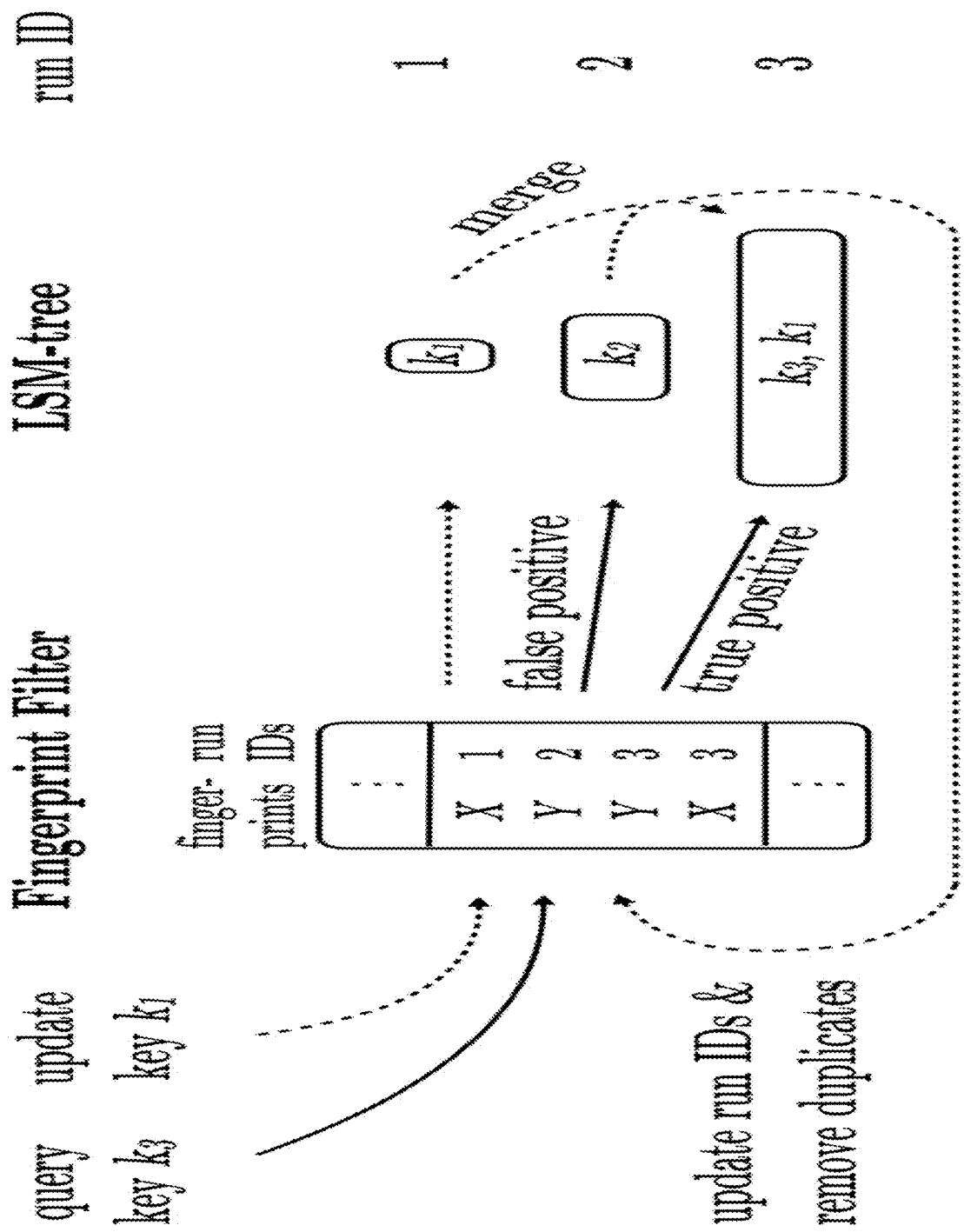
FIG. 3 illustrates an example of Chucky's high level architecture.

FIG. 3 illustrates the architecture of Chucky, which uses a management data structure (MDS) to map each physical entry in the LSM-tree to one MDS entry that may include a fingerprint and a run ID. The figure also illustrates the query and update workflows with solid and dashed lines, respectively.

In FIG. 3, keys k_1, k_2 and k_3 reside across various runs but happen to be mapped by the FF's hash function to the same FF bucket. Keys k_2 and k_3 have a colliding fingerprint Y while key k_1 has a different fingerprint X. The application queries key k_3, and so we reach the bucket shown in the figure and traverse its fingerprints from those belonging to younger runs first (i.e., to find the most recent entry's version). For Run1, we have a negative as the fingerprint is different. For Run 2, we have a false positive leading to a wasted storage I/O. For Run 3, we have a true positive, and so the target entry is returned to the application.

Whenever the LSM-tree's buffer flushes a new batch of application updates to storage, Chucky adds an FF entry for each key in the batch (including for tombstones). For example, consider entry k_1 in FIG. 3, for which there is originally one version at Run 3. A new version of this entry is then flushed to storage as a part of Run 1. As a result, Chucky adds a new FF entry to account for this updated version. This leads to temporary space-amplification (SA), which is later resolved through merging while entries are brought to memory to be sort-merged.

This SA is modest since the LSM-tree's exponential structure restricts the average number of versions per entry (e.g. T/(T-1)<2 with Leveling or Lazy-Leveling). In fact, BFs exhibit exactly the same memory SA since each version of an entry across different runs' BFs takes up M bits per entry.

For every obsolete entry identified and discarded while merging runs, Chucky removes the corresponding entry from the FF.

For every other entry, Chucky updates its run ID to the ID of the new run being created.

Hence, Chucky maintains the FF's run IDs without requiring any additional storage I/Os.

Furthermore, Chucky allows run IDs to be inherited across merge operations to obviate FF updates and save memory I/Os. It does this by setting the run ID of the j\textth oldest run at Level i of the LSM-tree to (i−1)*K+j. Thus, the run IDs range from 1 to A, where A the number of runs (from Equation (1)). Effectively, this means that an entry's run ID only changes when the entry is merged into a new level, but not when a given entry stays at the same level after a merge.

For example in FIG. 3, when merging Runs 1, 2 and 3 into a new run at Level3, the new run also gets assigned a run ID of 3. During the merge operations, we identify and remove entry k_1's older version from the FF and update the run IDs of entry k_2 and of the new version of entry k_1 to 3. However, we keep Entry k_3's run ID the same since the new run inherits the older Run 3's ID.

An application query probes the FF once while an update accesses it L amortized times (once for each time the updated entry moves into a new level).

Table 3 summarizes these properties. Relative to the memory I/O complexities of BFs in Table 1, Chucky reduces querying cost to a constant. Furthermore, it cheapens update cost for greedier merge policies and thereby decouples the memory I/O costs of queries and updates. In this way, Chucky dominates Bloom filters in terms of memory bandwidth.

TABLE 3

Chucky's invocation complexities

|  | Leveling | Lazy-leveling | Tiering |
| --- | --- | --- | --- |
| Application query | O(L) | O(1) | O(1) |
| Application update | O(L) | O(L) | O(L) |

TABLE 4

FPR bounds without run ID compression

|  | Leveling | Lazy-leveling | Tiering |
| --- | --- | --- | --- |
| Uniform | $O(2^{-M} * L)$ | $O(2^{-M} * L*T)$ | $O(2^{-M} * L*T)$ |
| Optimal | $O(2^{-M})$ | $O(2^{-M})$ | $O(2^{-M} * T)$ |

As we saw earlier, binary encoded run IDs within FF buckets grow with data size thus taking bits from fingerprints and increasing the false positive rate. To prevent this problem, we now explore in detail how to keep run IDs as small as possible using compression.

Run IDs are extremely compressible because they follow an approximately geometric probability distribution.

We formalize this using Equation (5), which denotes $p_i$ as the fraction of user data at Level i of the LSM-tree.

$$p_i = \frac{T-1}{T^{L-i}} * \frac{T^{L-1}}{T^{L-1}} \approx \frac{T-1}{T} * \frac{1}{T^{L-i}} \quad (5)$$

A run with ID j resides at level [j/K] of the LSM-tree. It's frequency is therefore that levels probability $p_{[j/K]}$ (from equation 5) divided by the number of runs at that level $A_{[k/K]}$ (from equation 1).

Thus, we denote $f_j$ as the frequency of the j'th run ID in equation (6).

$$f_j = \frac{p[j/K]}{A[j/K]} \quad (6)$$

These probabilities decrease exponentially for runs at smaller levels. Hence, it is possible to represent larger runs' IDs with few bits and smaller runs' IDs with more bits. Since smaller runs' IDs are exponentially less frequent, the average number of bits used to represent a run ID would stay small.

To establish a limit on how much run IDs can be compressed, we derive their Shannon entropy, which represents a lower bound on the average number of bits needed to represent items within a given probability distribution.

We do so in Equation (7) by stating the definition of entropy over the different run IDs' probabilities, plugging in Equations (1) and (5) for $A_i$ and $p_i$, respectively, and simplifying.

Interestingly, the entropy converges to a constant that is independent of the number of levels and hence does not grow with data size.

The intuition is that the exponential decrease in run ID probabilities for smaller levels trumps the fact that run IDs at smaller levels would require more bits to represent uniquely.

$$H = \sum_{j=1}^{A \to \infty} -f_i * \log_2(f_i) = \log_2\left(Z^{\frac{T-1}{T}} * K^{\frac{1}{T}} * \frac{T^{\frac{T-1}{T}}}{T-1}\right) \quad (7)$$

By plugging Equation (7) as the run ID length D of Equation, we obtain FPR bounds in Table 4. These bounds hold for any FF for which the number of fingerprints checked per lookup is a small constant (i.e., all FFs to date in practice).

The fact these bounds are lower than those in Table 2 for optimal BFs reaffirms our approach; an FF with compressed run IDs may be able to match or even improve on BFs in terms of FPR. % In the next section, we show how to do this in practice.

To compress the run IDs in practice, we use Huffman coding. The Huffman encoder takes as input the run IDs along with their probabilities (from Equation (6)). As output, it returns a binary code to represent each run ID and whereby more frequent run IDs are assigned shorter codes. It does so by creating a binary tree from the run IDs by connecting the least probable run IDs first as subtrees. A run ID's ultimate code length corresponds to its depth in the resulting tree.

Figure 4:
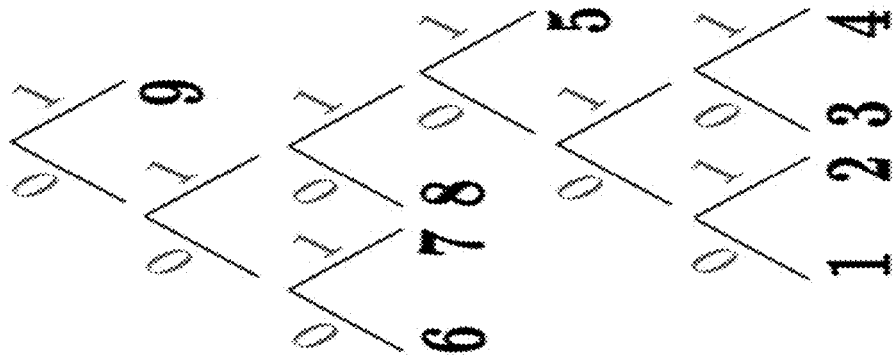
FIG. 4 illustrates an example of Huffman tree.
Figure 4:
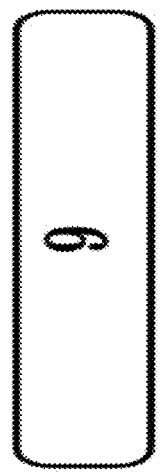

FIG. 4 illustrates a Lazy-Leveled LSM-tree (This tree's parameters are T=5, K=4, Z=1) with labeled run IDs, each with a corresponding frequency from Equation (6). We feed these run IDs and their frequencies into a Huffman encoder to obtain the Huffman tree shown alongside. The code for a run is given by concatenating the tree's edge labels on the path from the root node to the given run ID's leaf node. For instance, the codes for run IDs 4, 8 and 9 are 011011, 010 and 1, respectively.

With Huffman coding, no code is a prefix of another code. This property allows for unique decoding of an input bit stream by traversing the Huffman tree starting at the root until we reach a leaf, outputting the run ID at the given leaf, and then restarting at the root. For example, the input bit stream 11001 gets uniquely decoded into run IDs 9, 9 and 7 based on the Huffman tree in FIG. 4. This property allows us to uniquely decode all run IDs within a bucket without the need for delimiting symbols.

We measure the encoded run IDs' size using their average code length (ACL) as defined in Equation (8), where $l_j$ is the code length assigned to the j'th run.

For example, this equation computes 1.52 bits for the Huffman tree in FIG. 4. This is a saving of 62% relative to binary encoding, which would require four bits to represent each of the nine run IDs uniquely.

$$ACL = \sum_{j=1}^{A} -l_j * f_j \quad (8)$$

It is well-known in information theory that an upper bound on a Huffman encoding's ACL is the entropy plus one. The intuition for adding one is that each code length is rounded up to an integer. We express this as ACL≥H+1, where H is the entropy from Equation (7). We therefore expect the ACL in our case to converge and become independent of the data size, the same as Equation (7).

Figure 5:
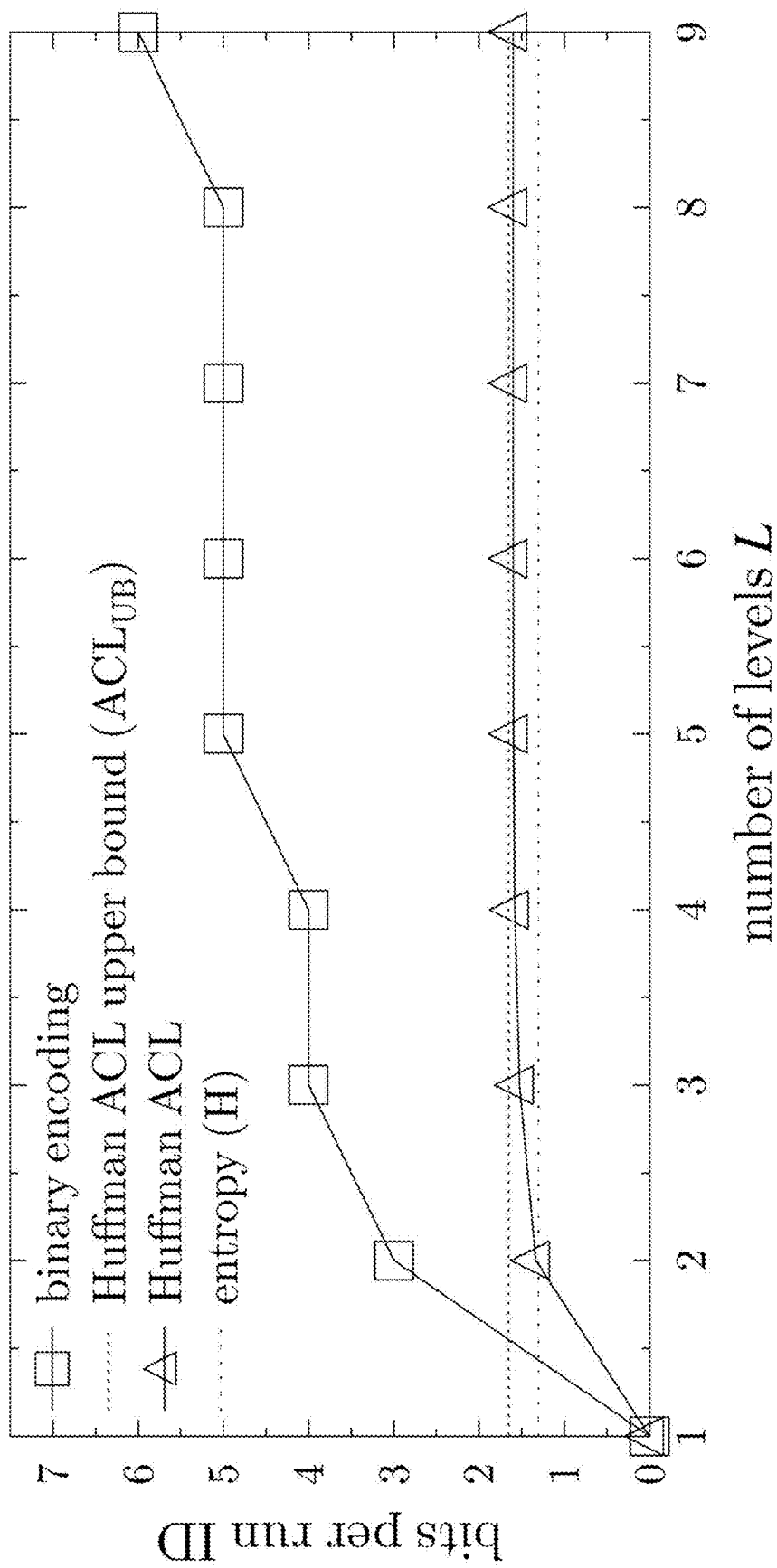
FIG. 5 illustrates an example of an outcome of compression.

We verify this in FIG. 5 by increasing the number of levels for the example in FIG. 4 and illustrating the Huffman ACL, which indeed converges. The intuition is that while runs at smaller levels get assigned longer codes, these codes are exponentially less frequent. In contrast, a binary encoding requires more bits to represent all run IDs uniquely. Thus, Huffman encoding allows to better scale memory footprint.

Among compression methods that encode one symbol at a time, Huffman coding is known to be optimal in that it minimizes the ACL. However, the precise ACL is difficult to analyze because the Huffman tree structure is difficult to predict from the onset. Instead, we can derive an even tighter upper bound on Equation(8) than before by assuming a less generic coding method and observing that the Huffman ACL will be at least as short. For example, we can represent each run ID using (1) a unary encoded prefix of length L−i+1 bits to represent Level i followed by (2) a truncated binary encoding suffix of length about $\log_2(A_i)$ to represent each of the $A_i$ runs at Level i uniquely. This is effectively a Golomb encoding, which is also applicable to our problem and easier to analyze.

However, we focus on Huffman encoding as it allows to encode multiple symbols at a time. We harness this capability momentarily. We derive this encoding's average length in Equation (9) as ACL_UB and Illustrate it in FIG. 5 as a reasonably tight upper bound of the Huffman ACL.

$$ACL_{UB} = \sum_{i=1}^{L} p_i * (L - i + 1 + \log_2(A_i)) = \frac{T}{T-1} + \log_2\left(Z^{\frac{T-1}{T}} * K^{\frac{1}{T}}\right) \quad (9)$$

FIG. 5 further plots the entropy of the run IDs' frequency distribution from Equation (7).

As shown, there is a gap between the Huffman ACL and the entropy. In fact, in FIG. 6 we show that as we increase the LSM-tree's size ratio T, the gap between the ACL and the entropy grows. (The figure is drawn for a Leveled LSM-tree (i.e., K=1 and Z=1)). The reason is that so far we have been encoding one run ID at a time, meaning that each run ID requires at least one bit to represent with a code. Hence, the ACL cannot drop below one bit per run ID. On the other hand, the entropy continues to drop towards zero as the probability distribution becomes more skewed since the information content (i.e., the amount of surprise) in the distribution decreases. A general approach in information theory to overcome this limitation is to encode multiple symbols at a time, as we now continue to explore.

A common technique for an FF to achieve a high load factor at a modest FPR sacrifice is to store multiple fingerprints per bucket.

We now show how to leverage this FF design decision to collectively encode all run IDs within a bucket to further push compression.

Figure 7:
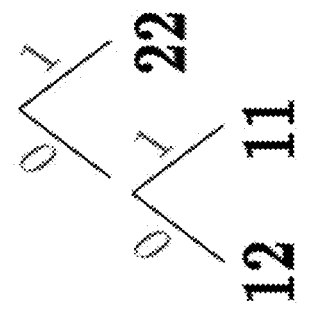
FIG. 7 illustrates an example of a compression of run ID and of a compression of a combination run ID.
Figure 7:
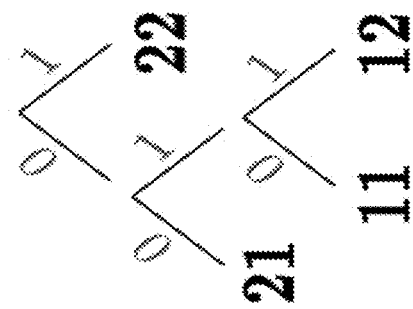
Figure 7:
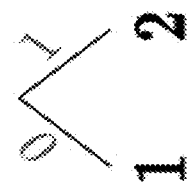
Figure 7:
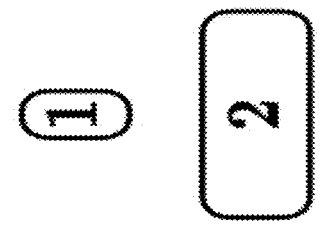

FIG. 7 gives an example of how to encode permutations of two run IDs at a time for a Leveled LSM-tree (with two levels and size ratio T of 10). The probability of a permutation is the product of its constituent run IDs' probabilities from Equation (6). For example, the probability of permutations 21 and 22 are 10/11*1/11 and (10/11)^2, respectively. By feeding all possible run IDs permutations of size two along with their probabilities into a Huffman encoder, we obtain the Huffman tree labeled Perms with an ACL of 0.63 in FIG. 7.

This is an improvement over encoding one run ID at a time. The intuition for the improvement is that we can represent the most common permutations with fewer bits than the number of symbols in the permutation.

Figure 6:
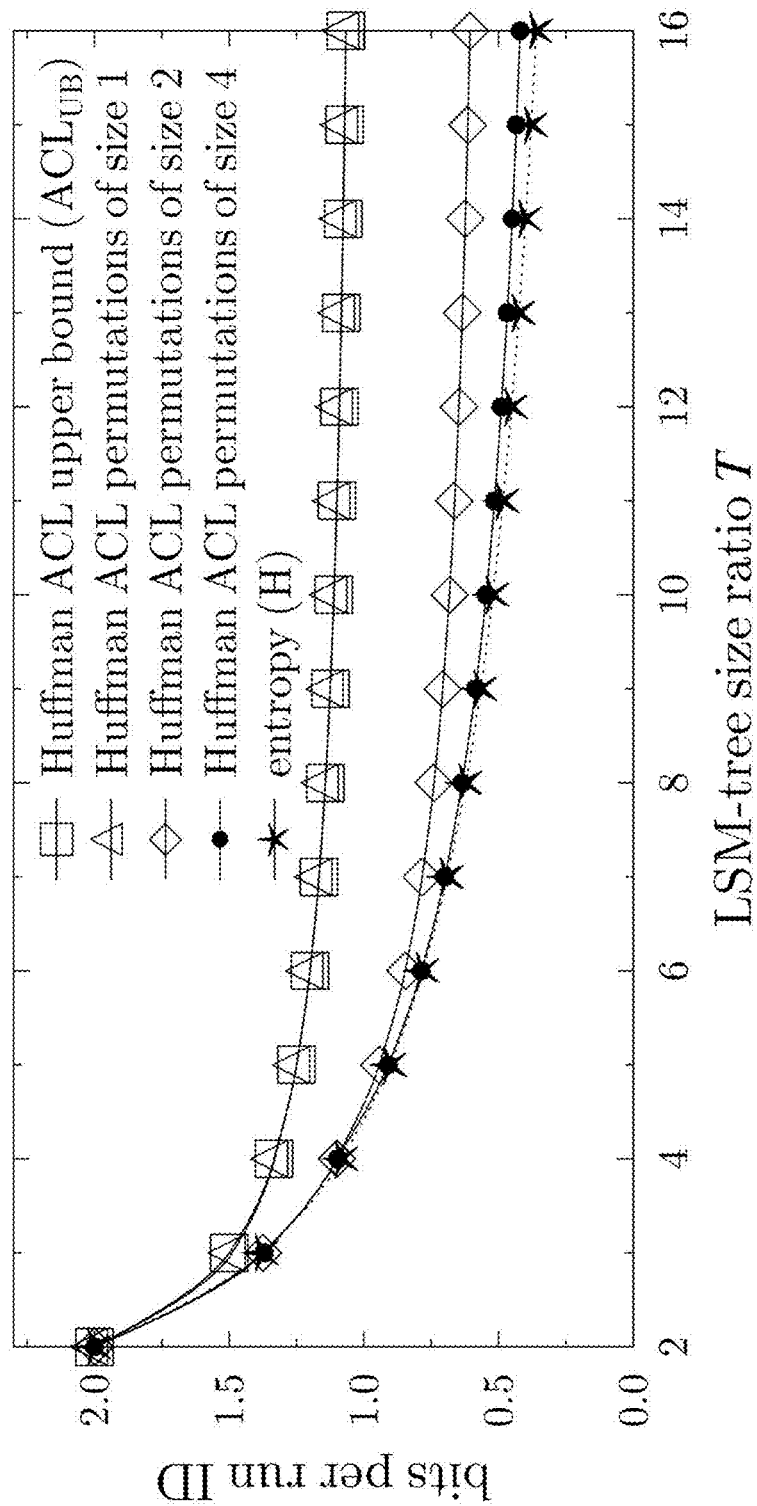
FIG. 6 illustrates an example of a relationship between run ID average size and LSM tree size ratio T.

FIG. 6 shows that as we increase the permutation size, the ACL of the resulting Huffman tree approaches the entropy. % which approximates the ACL well with permutations of size four or more.

In the example in FIG. 7, there are two permutations of the same run IDs: 21 and 12. For a query that encounters either permutation, the same lookup process ensues: we check Run 1 for the key (i.e., first the fingerprint and in case of a positive also in storage) and if we did not find it we proceed to check Run 2. The fact that both permutations trigger the same process implies that permutations encode redundant information about order. Instead, we can encode combinations of Run IDs, as shown in FIG. 7, where the combination 12 replaces the two prior permutations.

As there are fewer combinations than permutations $$\binom{S + A - 1}{S}$$

as opposed to $A^S$, we need fewer bits to represent them, and so the ACL can drop even lower than before.

To lower bound the ACL with encoded combinations, we derive a new entropy expression $H_{comb}$ in Equation 10 by subtracting all information about order from our original entropy expression H (from Equation(7)). This order information amounts to $\log_2(S!)$ bits to permute S run IDs while binomially discounting $\log_2(j!)$ bits for any run ID that repeats j times. Since combinations are multinomially distributed, an alternative approach for deriving the same expression is through the entropy function of the multinomial distribution. We divide by S to normalize the expression to be per entry rather than per bucket.

$$H_{comb} = H - \frac{1}{S} * \left(\log_2(S!) - \sum_{i=1}^{A} \sum_{j=0}^{S} * \binom{S}{j} * (1 - f_i)^{S-j} * \log_2(j!)\right) \quad (10)$$

Figure 8:
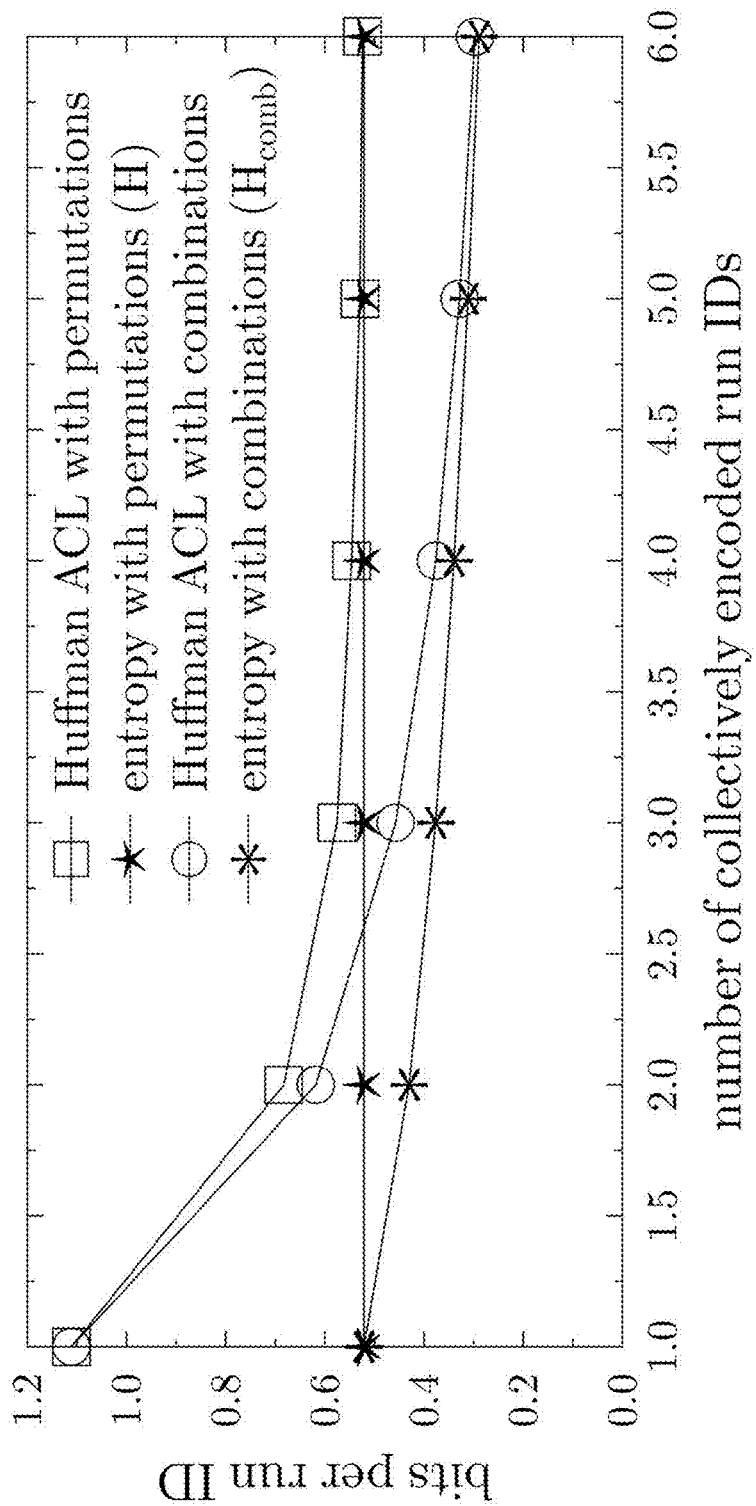
FIG. 8 illustrates an example of a relationship between run ID average size and number of run IDS represented by a single combination run ID.

FIG. 8 compares $H_{comb}$ to H as we increase the number of collectively encoded run IDs. (This example uses a Leveled LSM-tree with T=10, K=1, Z=1 and L=6). We observe that the more collectively encoded run IDs, the more $H_{comb}$ drops as it eliminates more redundant information about order relative to H.

To use encoded combinations in practice, we must sort the fingerprints within each bucket by their run IDs to be able to identify which fingerprint corresponds to which run ID. To do the actual encoding, we feed all possible combinations along with their probabilities into a Huffman encoder. We express the probability $c_{prob}$ of a combination c in Equation (11) using the multinomial distribution, where c(j) denotes the number of occurrences of the j\textth run ID within the combination.

For example, for the combination 12 in FIG. 7, we have S=2, c(1)=1 and c(2)=1. Hence, the probability is 2! *(1/11)*(10/11)=10/121.

$$c_{prob} = S! * \prod_{j=1}^{A} \frac{f_j^{c(j)}}{c(j)!} \quad (11)$$

With combinations, the ACL is $\Sigma_{c \in C} I_c * c_{prob}/S$, where C is the set of all combinations and $I_c$ is the code length for Combination c (we divide by S to express the ACL per run ID rather than per bucket). We observe that the combinations ACL dominates the permutations ACL in FIG. 8, and that it converges with the combinations entropy as we increase the number of collectively encoded run IDs.

In the rest of the paper, we continue with encoded combinations as they achieve the best compression.

Aligning Codes with Fingerprints

With run ID codes being variable-length due to compression, aligning them along with fingerprints within FF buckets becomes a challenge. We illustrate this in FIG. 9A by aligning one run ID combination code for two entries along with two five-bit fingerprints (FPs) within sixteen-bit FF buckets. This example is based on the LSM-tree instance in FIG. 4 except we now encode run ID combinations instead of encoding every run ID individually. The term $I_{x,y}$ in the figure is the code length assigned to a bucket with coinciding run IDs x and y. We observe that while some codes and fingerprints perfectly align within a bucket (RowI), others exhibit underflows (RowII) and overflows (RowsIII and IV).

Underflows occur within buckets with frequent run IDs as a result of having shorter codes. They are undesirable as they waste bits that could have otherwise been used for increasing fingerprint sizes. On the other hand, overflows occur in buckets with less frequent run IDs as a result of having longer codes. They are undesirable as they require storing the rest of the bucket content elsewhere, thereby increasing memory overheads.

Figure 10:
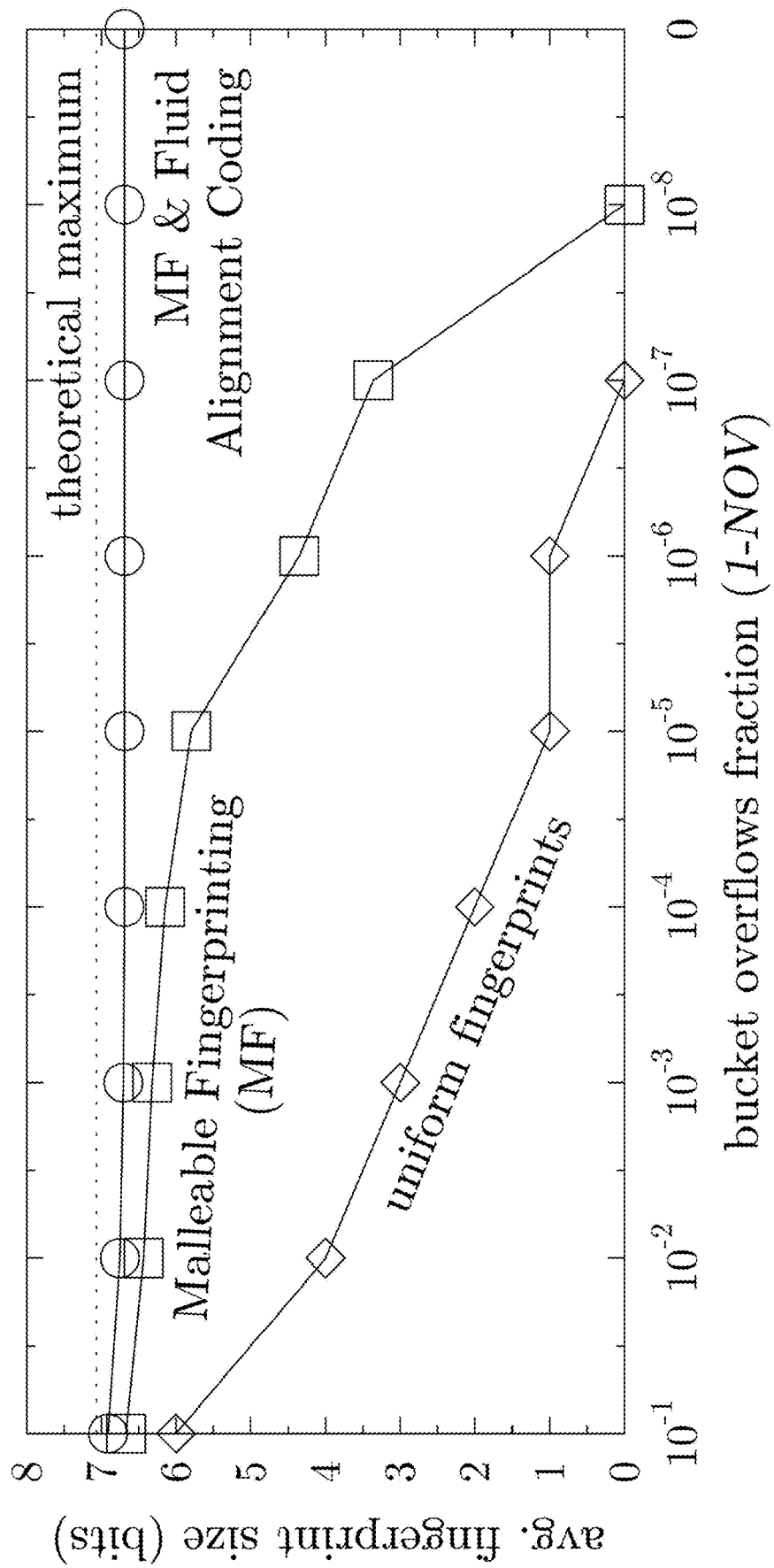
FIG. 10 illustrates examples of the benefits of using malleable fingerprinting and fluid alignment coding.

We illustrate the contention between overflows and underflows in FIG. 10 with the curve labeled uniform fingerprints. The figure is drawn for a Lazy-Leveled LSM-tree with configuration T=5, K=4, Z=1, L=6 and an FF with 32 bit buckets containing 4 entries. The figure varies the maximum allowed fraction of overflowing FF buckets and measures the maximum possible corresponding fingerprint size.

As shown, with a uniformly sized fingerprints, the fingerprint size has to rapidly decrease to guarantee fewer overflows.

To address this, our insight that the run ID combination distribution (in Equation (11)) is heavy-tailed since the underlying run ID distribution is approximately geometric. Our approach is to therefore to guarantee that codes and fingerprints perfectly align within the most probable combinations by adjusting their sizes, while allowing all the other combinations along the distribution's heavy tail to overflow. We achieve this in two steps using two complementary techniques: Malleable Fingerprinting (MF) and Fluid Alignment Coding (FAC).

Malleable Fingerprinting (MF) To facilitate alignment, MF allows entries from different LSM-tree levels to have different fingerprint sizes.

However, an individual entry's fingerprint length stays the same even if it gets swapped across buckets by the FF's collision resolution method. This means that no fingerprint bits ever need to be dynamically chopped or added. Once an entry is moved into a new level, MF assigns it a new fingerprint size if needed while it is brought to memory to be sort-merged.

The question that emerges with MF is how to choose a fingerprint length for each level to strike the best possible balances between fingerprint sizes and overflows. We frame this as an integer programming problem. Whereby $FP_i$ denotes the (positive integer) length of fingerprints of entries at Level i. The objective is to maximize the average fingerprint size as expressed in Equation (12):

$$\text{Maximize} \sum_{i=1}^{L} FP_i * p_i \quad (12)$$

We constrain the problem using an additional parameter NOV for the fraction of non-overflowing buckets we want to guarantee (ideally at least 0.9999). We use this parameter to define $C_{freq}$ as a subset of C that contains only the most probable run ID combinations in C whose cumulative probabilities fall just above NOV.

We add it to the problem in Equation 13 as a constraint requiring that for all c in $C_{freq}$, the code length (denoted as $I_c$) plus the cumulative fingerprint length (denoted as $c_{FP}$) do not exceed the number of bits B in the bucket:

$$\forall_C = C\text{freq}: C_{FP} + I_c \leq B \quad (13)$$

Figure 9:
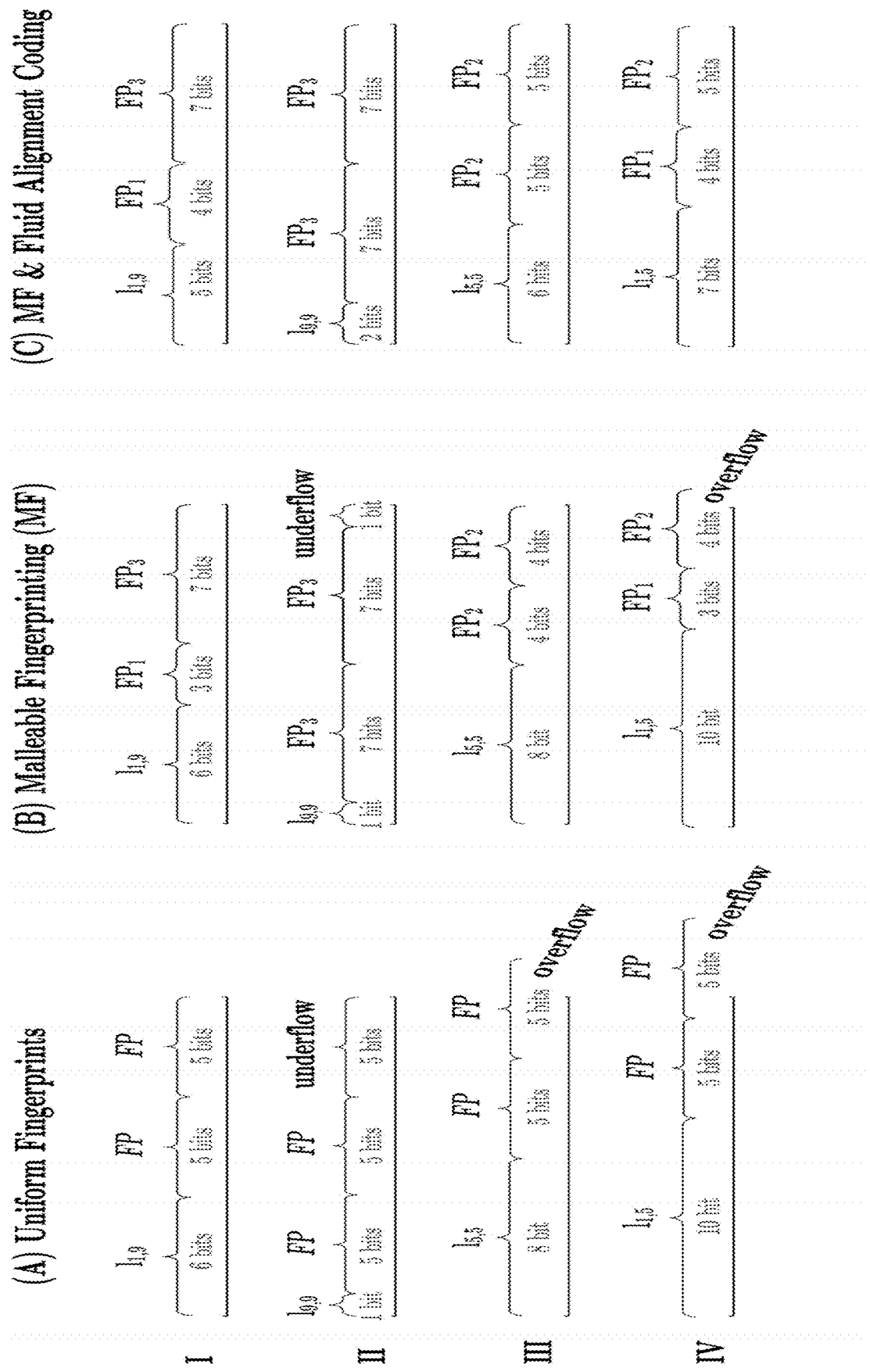
FIG. 9 illustrates examples of alignment issues and solutions.

While integer programs are NP-complete and thus difficult to globally optimize, we exploit the particular structure of our problem with an effective hill-climbing approach shown in Algorithm 1. The algorithm initializes all fingerprint sizes to zero. It then increases larger levels' fingerprint size as much as possible, moving to a next smaller level when the overflow constraint in Equation 13 is violated. The rationale for lengthening larger levels' fingerprints first is that their entries are more frequent. In this way, the algorithm follows the steepest ascent. FIG. 9 shows how MF reduces the severity of underflows (Row II) while at the same time eliminating some overflows (Row III). As a result, it enables better balances between overflows and average fingerprint size as shown in FIG. 10.

Fluid Alignment Coding (FAC). FIG. 9B illustrates that even with MF, underflows and overflows can still occur (Rows II and IV, respectively). To further mitigate them, we introduce FAC. FAC exploits a well-known trade-off in information theory that the smaller some codes are set within a prefix code, the longer other codes must be for all codes to remain uniquely decodable.

This trade-off is embodied in the Kraft-McMillan inequality, which states that for a given set of code lengths L, all codes can be uniquely decodable if $1 \geq \Sigma_{l \in L} 2^{-l}$. The intuition is that code lengths are set from a budget amounting to 1, and that smaller codes consume a higher proportion of this budget.

To exploit this trade-off, FAC assigns longer codes that occupy the underflowing bits for very frequent bucket combinations. As a result, the codes for all other bucket combinations can be made shorter. This creates more space in less frequent bucket combinations, which can be exploited to reduce overflows and to increase fingerprint sizes for smaller levels. We illustrate this idea in FIG. 9C.

The combination in Row II, which is the most frequent in the system, is now assigned a longer code than before. This allows reducing the code lengths for all other combinations, which in turn allows setting longer fingerprints to entries at Levels 1 and 2 as well as to eliminate the bucket overflow in Row IV.

We implement FAC on top of MF as follows. First, we replace the previous overflows constraint (Equation (13)) by a new constraint, shown in Equation\refeq:constraint3. Expressed in terms of the Kraft-McMillan inequality, it ensures that the fingerprint sizes stay short enough such that it is still possible to construct non-overflowing buckets with uniquely decodable codes for all combinations in $C_{freq}$. Furthermore, it ensures that all other buckets combinations not in $C_{freq}$ can be uniquely identified using unique codes that are at most the size of a bucket B.

$$1 \geq \sum_{c \in C} \begin{matrix} 2^{-(B-c_{FP})}, \text{ for } c \in C_{freq} \\ 2^{-B}, \text{ else} \end{matrix} \qquad (14)$$

Note that Equation 14 does not rely on knowing Huffman codes in advance (i.e., as Equation (13) does). Thus, we can run the Huffman encoder after rather than before finding the fingerprint lengths using Algorithm 1.

Third, we run the Huffman encoder only on combinations in $C_{freq}$ while setting the frequency input for a combination c as $2^{-(B-c_{FP})}$ as opposed to using its multinomial probability (in Equation (11)) as before.

This causes the Huffman encoder to generate codes that exactly fill up the leftover bits B-$c_{FP}$. Fourth, for all combinations not in $C_{freq}$ we set uniformly sized binary codes of size B bits, which consist of a common prefix in the Huffman tree and a unique suffix. In this way, we can identify and decode all codes across both sets uniquely. % which consist of a common prefix that's not in the Huffman tree and a unique suffix.

FIG. 10 shows that MF and FAC eliminate the contention between overflows and fingerprint size when applied together. In fact, they keep the average fingerprint size close (within half a bit in the figure) of the theoretical maximum, obtained by subtracting the combinations entropy (in Eq. (10)) from the number of bits per entry M. We use MF and FAC by default for the rest of the paper.

Algorithm 1's run-time is O(L*M*|C|), where L*M is the number of iterations and |C| is the cost of evaluating the constraint in Equation (14). In addition, the time complexity of the Huffman encoder is O(|C| *log_2(|C|)). This workflow is seldom invoked (i.e., only when number of LSM-tree levels changes), and it can be performed offline. Its run-time is therefore practical (each of the points in FIG. 10 takes a fraction of a second to generate).

Chucky's FPR is tricky to precisely analyze because the fingerprints have variable sizes that are not known from the onset.

Instead, we give a conservative approximation to still allow reasoning about system behavior. First, we observe that with FAC, the average code length is always at least one bit per entry, and so we use our upper bound ACL_UB from Equation (9) to slightly overestimate it. Hence, we approximate the average fingerprint size as M−ACL_UB and thus the FPR over a single fingerprint as $2^{-(M-ACL_{UB})}$. We multiply this expression by a factor of Q, which denotes average number of fingerprints searched by the underlying FF per probe (e.g., for a Cuckoo filter with four entries per bucket Q about 8). Thus, we obtain Equation (15), for which the interpretation is the expected number of false positives for a query to a non-existing key. Practically, the actual FPR tends to be off from this expression by a factor of at most two.

$$FPR_{approx} = Q * 2^{-M+ACU_{UB}} \qquad (15)$$

We now discuss the data structures needed to decode run IDs on application reads and to recode them on writes. Specifically, we show how to prevent these structures from becoming bottlenecks.

Since Huffman codes are variable-length, we cannot generally decode them in constant time (e.g., using a lookup table) as we do not know from the onset how long a given code in question is. Hence, decoding a Huffman code is typically done one bit at a time by traversing the Huffman tree from the root to a given leaf based on the code in question. A possible problem is that if the Huffman tree is large, traversing it can require up to one memory I/O per node visited.

To restrict this cost, we again use the insight that the bucket combination distribution in Equation 11 is heavy-tailed. Hence, it is feasible to store a small Huffman Tree partition in the CPU caches to allow to quickly decode only the most common combination codes.

To control the cached Huffman tree's size, we set the parameter NOV from the last subsection to 0.9999 so that the set of combinations $C_{freq}$ for which we construct the Huffman tree includes 99.99% of all combinations we expect to encounter.

Figure 11:
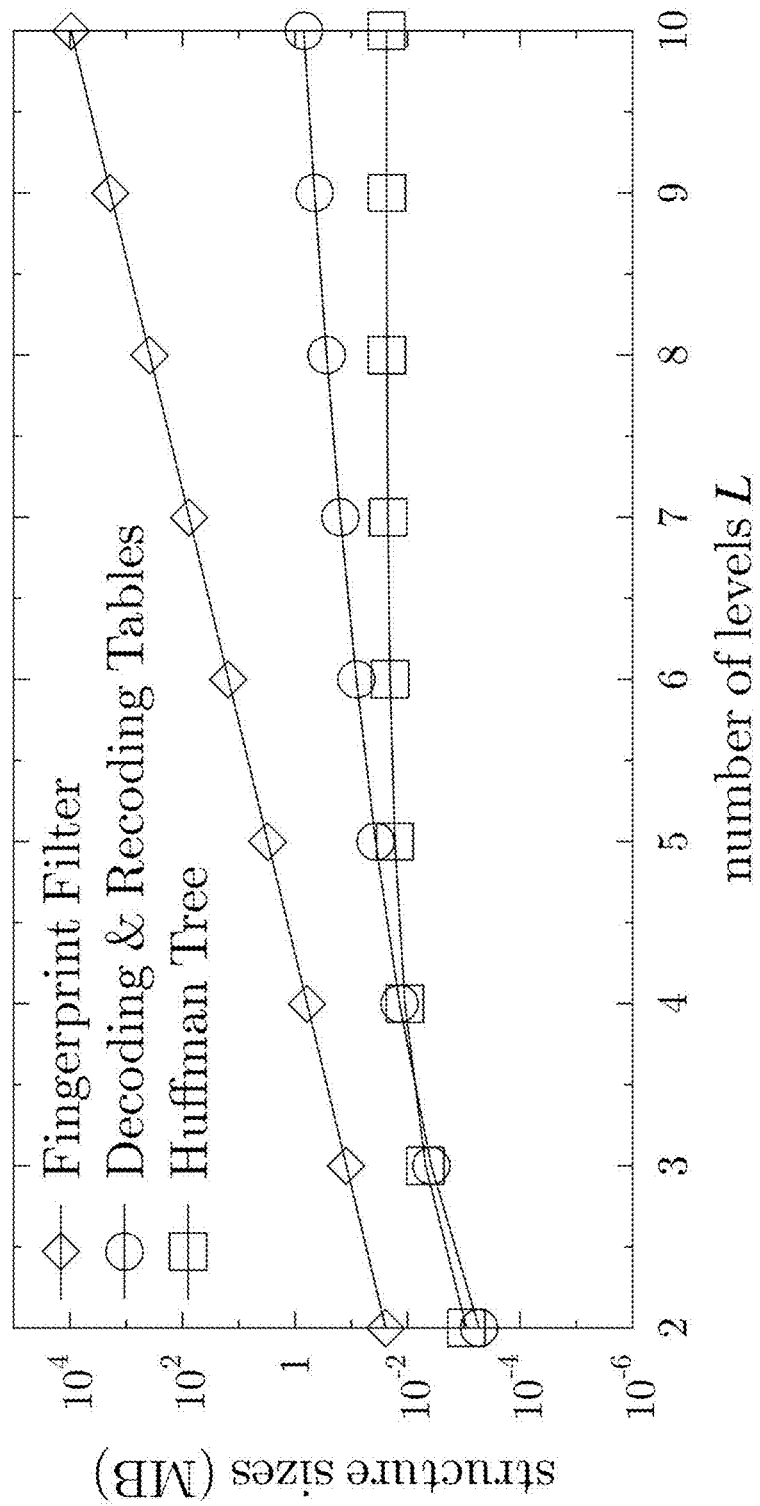
FIG. 11 illustrates an example of a relationship between the size of the first management data structure (MDS) and number of LSM tree levels.

FIG. 11 measures the corresponding tree's size. We continue here with the LSM-tree configuration from FIG. 4. Each Huffman tree node is eight bytes. Since it occupies a few tens of kilobytes, it is small enough to fit in the CPU caches.

In fact, the figure highlights an important property that as we increase the data size, the cached Huffman tree's size converges. The reason is that the probability of a given bucket combination (in Equation (11)) is convergent with respect to the number of levels, and so any set whose size is defined in terms of its constituent combinations' cumulative probabilities is also convergent in size with respect to the number of levels. This property ensures that the Huffman tree does not exceed the CPU cache size as the data grows.

In addition to the Huffman tree, we use a Decoding Table in main memory for all other combination codes not in $C_{freq}$. To ensure fast decoding speed for DT, we exploit the property given in the last subsection that all bucket combinations not in $C_{freq}$ are assigned uniformly sized codes of size B bits. As these codes all have the same size, we know from the onset how many bits to consider, and so we can map these codes to labels in a lookup array as opposed to a tree. This guarantees decoding speed in at most one memory I/O.

FIG. 11 measures the DT size as we increase the number of levels on the x-axis (each DT entry is eight bytes). As the DT contains about $$|C| = \binom{S+A-1}{S}$$

entries, its size grows slowly as we increase the number of levels (and thus the number of runs A). We observe that it stays smaller than a megabyte even for a very large LSM-tree instance with ten levels.

To handle bucket overflows, we use a small hash table to map from an overflowing bucket's ID to the corresponding fingerprints. Its size is (1-NOV)=0.0001 of the FF size. It is accessed seldom, i.e., only for infrequent bucket combinations, and it supports access in O(1) memory I/O.

To find the correct code for a given combination of run IDs while handling application writes, we employ a Recoding Table. We use a fixed-width format to represent a run ID combination, and so the RT can also be structured as a lookup array. It costs at most one memory I/O to access and its size scales the same as the Decoding Table in FIG. 11. Note that the most frequent RT entries are in the CPU caches during run-time and thus cost no memory I/Os to access.

FIG. 11 also illustrates the FF size as we increase the number of LSM-tree levels. We observe that all auxiliary data structures are comparatively small, and we've seen that they entail few memory accesses. Thus, Chucky prevents de/recoding from becoming a performance or space bottleneck.

Integration with Cuckoo Filter

We now show how to integrate Chucky with Cuckoo Filter (CF), which we employ due to its design simplicity and ease of implementation.

CF consists of an array of buckets, each with four fingerprint slots. During insertion, an entry with key x is hashed to two buckets b_1 and b_2 using Equations (16) and (17). A fingerprint of key x is then inserted into whichever bucket has space.

$$b_1 = \text{hash}(x) \tag{16}$$

$$b_2 = b_1 \oplus \text{hash}(x\text{'s fingerprint}) \tag{17}$$

If both buckets are full, however, some fingerprint y from one of these buckets is evicted to clear space. The fingerprint y is swapped into its alternative bucket using Equation\refeq:cuckooC, which does not rely on the original key (by virtue of using the xor operator) but only on the fingerprint and the bucket i that currently contains y.

$$j = i \oplus \text{hash}(y) \tag{18}$$

The swapping process continues recursively either until a free bucket slot is found for all fingerprints or until a swapping threshold is reached, at which point the original insertion fails. Querying requires at most two memory I/Os as each entry is mapped to two possible buckets. Henceforth in the paper, we employ a Cuckoo filter with four slots per bucket. Such a tuning is known to be able to reach 95% capacity with high probability without incurring insertion failures and with only 1-2 amortized swaps per insertion.

To implement Chucky on top of CF, we place a combination code at the start of each CF bucket followed by variable-sized fingerprints. We represent empty fingerprint slots using a reserved all-zero fingerprint coupled with the most frequent run ID to minimize the corresponding combination code length. In addition, we make the following adjustments.

Since Cuckoo filter relies on the XOR operator to locate an entry's alternative bucket, the number of buckets must be a power of two. This can waste up to 50% of the allotted memory, specifically whenever LSM-tree's capacity just crosses a power of two. To fix this, we borrow from Vacuum filter the idea of partitioning a CF into multiple independent CFs, each of which is a power of two, but where the overall number of CFs is flexible. In this way, capacity becomes adjustable by varying the number of CFs, and we map each key to one of the constituent CFs using a hash modulo operation. We set each CF to be 8 MB.

When Chucky reaches capacity, it needs to be resized to accommodate new data. However, a CF cannot be resized efficiently. The simplest approach is to rebuild Chucky from scratch when it reaches capacity. However, this approach forces an expensive scan over the dataset to reinsert all entries into the new instance of Chucky. Instead, we exploit the fact that merge operations into the largest level of the LSM-tree pass over the entire dataset. We use this opportunity to also build a new instance of Chucky and thereby obviate the need for an additional scan. We set the size of the new instance of Chucky to be larger by a factor of $$\frac{T}{T-1} * 1.05$$

than the current data size to accommodate data growth until the next full merge and to always maintain 5% spare capacity across all the CFs to prevent insertion failures.

Since Chucky assigns variable fingerprint sizes to entries at different levels, a problem arises whereby the CF can map different versions of an entry from across different levels to more than two CF buckets.

We resolve this by ensuring that all fingerprints comprise at least X bits, and we adapt the CF to determine an entry's alternative bucket based on its first X bits. This forces all versions of the same entry to reside in the same pair of CF buckets. In accordance with the Cuckoo filter paper, we set the minimum fingerprint size to 5 bits to ensure that an entry's two buckets are independent enough to achieve a 95% load factor.

Since a CF maps multiple versions of the same entry from different LSM-tree runs into the same pair of CF buckets, a bucket overflow can take place if there are more than eight versions of a given entry. Some FFs can address this problem out-of-the-box using embedded fingerprint counters (e.g., Counting Quotient Filter). For our CF design, however, we address this issue using an additional hash table (AHT), which maps from bucket IDs to the overflowing entries. With insertion-heavy workloads, AHT stays empty. Even with update-heavy workloads, AHT stays small since LSM-tree by design limits space-amplification and thus the average number of versions per entry (e.g., at most $$\frac{T}{T-1} \leq 2$$

with Leveling or Lazy Leveling). We check AHT for every full FF bucket that's encountered during a query or update thus adding to them at most O(1) additional memory access.

For each run, we persist its entries' fingerprints in storage. During recovery, we read only the fingerprints from storage and thus avoid a full scan over the data. We insert each fingerprint along with its run ID into a brand new CF series at a practically constant amortized memory I/O cost per entry. In this way, recovery is efficient in terms of both storage and memory I/Os.

Evaluation

We now give an expression to generically approximate the expected I/O arising due to the FF.

We use a machine with 32 GB DDR memory and four 2.7 GHz cores with 8 MB L3 caches running Ubuntu 18.04 LTS and connected to a 512 GB SSD through PCIe.

We use our own LSM-tree implementation, designed based on Dostoevsky, and which we are gearing towards commercial use. We added as baselines blocked cache and non-blocked BFs with uniform false positive rates (FPRs) to represent design decisions in RocksDB and Cassandra, respectively.

We also support optimal FPRs.

The default setup consists of a Lazy-Leveled LSM-tree with a 1 MB buffer, a size ratio of five, and with six levels amounting to about 16 GB of data. Each entry is 64B. There is a 1 GB block cache, and the data structure block size is 4 KB. Chucky uses ten bits per entry and 5% over-provisioned space. Hence, all BF baselines are assigned a factor of 1/0.95 more memory to equalize memory across the baselines.

Every point in the figures is an average of three experimental trials.

We use a uniform workload distribution to represent worst-case performance and a Zipfian distribution to create skew and illuminate performance properties when the most frequently accessed data is in the block cache.

FIG. 12A compares read/write latency with Chucky against blocked and non-blocked BFs (both with optimal FPRs) with a uniform workload as the data grows. Write latency is measured by dividing the overall time spent on filter maintenance by the number of writes issued by the application. Read latency is measured just before a full merge operation (when there are the most runs in the system) to highlight worst-case performance.

Non-blocked BFs exhibit the fastest growing latency as they require multiple memory I/Os per filter across a growing number of filters. We drop non-blocked BFs henceforth in the evaluation as they are noncompetitive.

With blocked BFs, read/write latency grows more slowly as they require at most one memory I/O per read or write.

Chucky's write latency also grows slowly with data as there are more levels across which run IDs need to be updated.

Crucially, we observe that Chucky is the only baseline that's able to keep read latency stable with data size as each read requires a constant number of memory I/Os.

FIG. 12B stacks read and write latency with Chucky against blocked BFs with different LSM-tree variants.

Chucky offers better cost balances across the board, mostly for its lower read latency. Nevertheless, Chucky also improves write cost for Leveled LSM-tree designs. The reason is that with Leveling, merging is greedy and so BFs are rapidly reconstructed leading to multiple BF insertions per entry per level. In contrast, Chucky always requires just one update per entry per level. Overall, Chucky not only improves the filter read/write cost balances but also makes them independent of the underlying LSM-tree variant. This makes the system easier to reason about and tune.

FIG. 12C compares the FPR for Chucky with both compressed and uncompressed run IDs to blocked BFs with both uniform and optimal space allocation. As we increase the data size, the FPR of Chucky with uncompressed run IDs increases since the run IDs grow and steal bits from the fingerprints.

With uniform BFs, the FPR also grows with data size as there are more filters across which false positives can take place. In contrast, with optimal BFs, smaller levels are assigned exponentially lower FPRs, and so the sum of FPRs converges to a constant that's independent of the number of levels. Similarly, Chucky's FPR stays constant as the data grows since the average run ID code length converges, thus allowing most fingerprints to stay large. The figure also includes the FPR model of Chucky from Equation (15) to show that it gives a reasonable approximation of the FPR in practice.

FIG. 12D shows that Chucky requires at least eight bits per entry to work (i.e., for codes and minimum fingerprint sizes). However, with eleven bits per entry and above Chucky offers better memory/FPR trade-offs than all BF variants. The reason is that BFs are known to exhibit suboptimal space use, which effectively reduces the memory budget by a factor of \ ln(2). Thus, Chucky scales the FPR better with respect to memory.

To allow Chucky to operate with fewer than eight bits per entry while also keeping the FPR low, it is possible to use a BF at the largest level of the LSM-tree and an FF for all smaller levels. We keep such a design out of scope for now due to space constraints.

FIG. 12F and FIG. 12G measure end-to-end read latency with uniform and Zipfian (with parameter s=1) workloads, respectively. Read latency is broken in three components: (1) storage I/Os, (2) in-memory search across the fence pointers, buffer, and block cache, and (3) filter search. In Part (F), relevant data is most often in storage and so storage I/Os dominates read cost. Since our SSD is fast, however, the BFs probes still impose a significant latency overhead that Chucky is able to eliminate. In Part (G), on the other hand, the workload is skewed, meaning that target data is most often in the block cache. In this case, the BFs become a bottleneck as they must be searched before the relevant block in the cache can be identified. Chucky alleviates this bottleneck thus significantly improving read latency.

FIG. 12H shows how throughput scales as we increase the data size for a workload consisting of 95% Zipfian reads and 5% Zipfian writes (modeled after WorkloadB). The BF baselines do not scale well as they issue memory I/Os across a growing number of BFs. Chucky with uncompressed run IDs also exhibits deteriorating performance as its FPR grows and leads to more storage I/Os. Chucky with compressed run IDs also exhibits deteriorating performance, mostly because the of the growing cost of the binary search across the fence pointers. However, Chucky provides better throughput with data size than all baselines because it scales the filter's FPR and memory I/Os at the same time.

Figure 13:
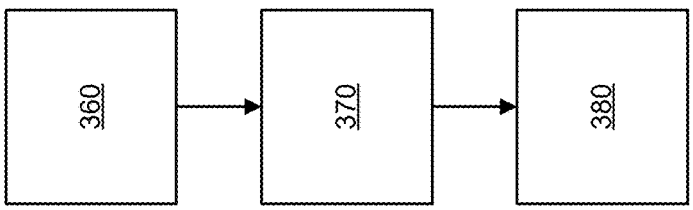
FIG. 13 is an example of a method.
Figure 13:
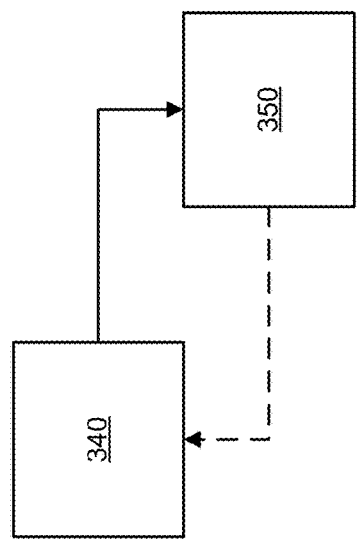
Figure 13:
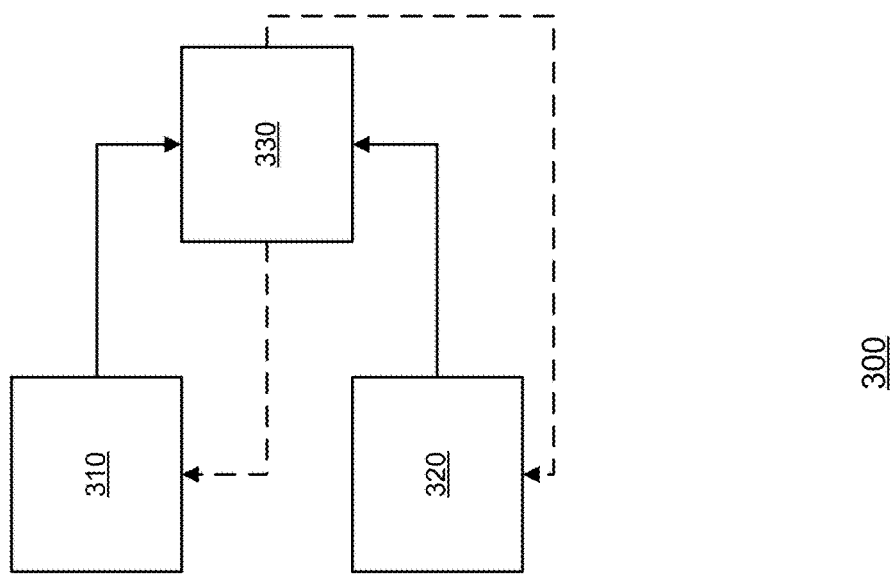

FIG. 13 illustrates an example of a method 300.

Method 300 is for managing a log structured merged (LSM) tree of key value (KV) pairs. The LSM tree is stored in a non-volatile memory, the method may include.

Method 300 may start by step 310.

Step 310 may include generating or receiving current fingerprints that are indicative of current KV pairs. Current KV pairs are included in a current run.

Step 310 may be followed by step 320 of writing the current run from a buffer to a current run location within the LSM tree, the current run may include current KV pairs. The current run may be sorted.

Steps 310 and 320 may be followed by step 330 of performing a run writing update of a management data structure (MDS) by adding to the MDS, mappings between the current KV pairs, the current fingerprints and a current run identifier.

The run writing update of the MDS reflects the execution of step 310.

Step 330 may be executed without checking an existence a previous version of a current KV pair within the LSM tree.

Step 330 may be executed regardless of an existence or a lack of existence of a previous version of a current KV pair within the LSM tree.

Step 330 may be followed by step 310 and/or 320.

Method 300 may include step 340 of updating the LSM tree by merging at least some runs of the LSM tree.

Step 340 may include merging a first run of the LSM tree that may include first KV pairs, with a second run of the LSM that may include second KV pairs.

Step 340 may include adding the second KV pairs to the first run, and wherein the performing of the merge update may include updating run identifiers associated with the second KV pairs while maintaining run identifiers associated with the first KV pairs.

Step 340 may include writing the first KV pairs and the second KV pairs to a third run of the LSM tree, wherein performing of the merge update may include updating run identifiers associated with the first KV pairs and with the second KV pairs.

Step 340 may include deleting a previous version of a KV pair when a newer version of the KV pair may include a value that represents a delete command.

Step 340 may include merging at least two runs that belong to different levels of the LSM tree.

Step 340 may include merging at least two runs that belong to a same level of the LSM tree.

Step 340 may be followed by step 350 of performing a merge update of the MDS to represent the merging.

Step 350 may be followed by step 340.

Method 300 may include triggering the merging of runs of one or more layers of the LSM tree whenever a run is written to the non-volatile memory.

Method 300 may include triggering the merging of runs of one or more layers of the LSM tree whenever the one or more layers reach a fullness level.

The merging may be executed according to any method such as leveling, lazy-leveling and tiering.

The MDS may include multiple buckets, each bucket may be configured to store metadata related to two or more KV pairs.

Method 300 may include step 360 of receiving a request to access a requested KV pair stored in the non-volatile memory. The access request may be a request to read the requested KV pair. The KV pair is referred to as a requested KV pair because it is included in the request.

Step 360 may be followed by step 370 of accessing the MDS, using a key of the requested KV pair to obtain a location of a relevant run.

Step 370 may be followed by step 380 of retrieving the relevant run when a relevant run exists. It should be noted that a dedicated value (tombstone) may be allocated for indicating to delete a previous KV pair. When the relevant run includes the key with such dedicated value the response is that the requested KV pair does not exist in the LSM tree.

Step 380 may be followed by waiting to receive a new request and jumping to step 360 when a request is received.

Figure 14:
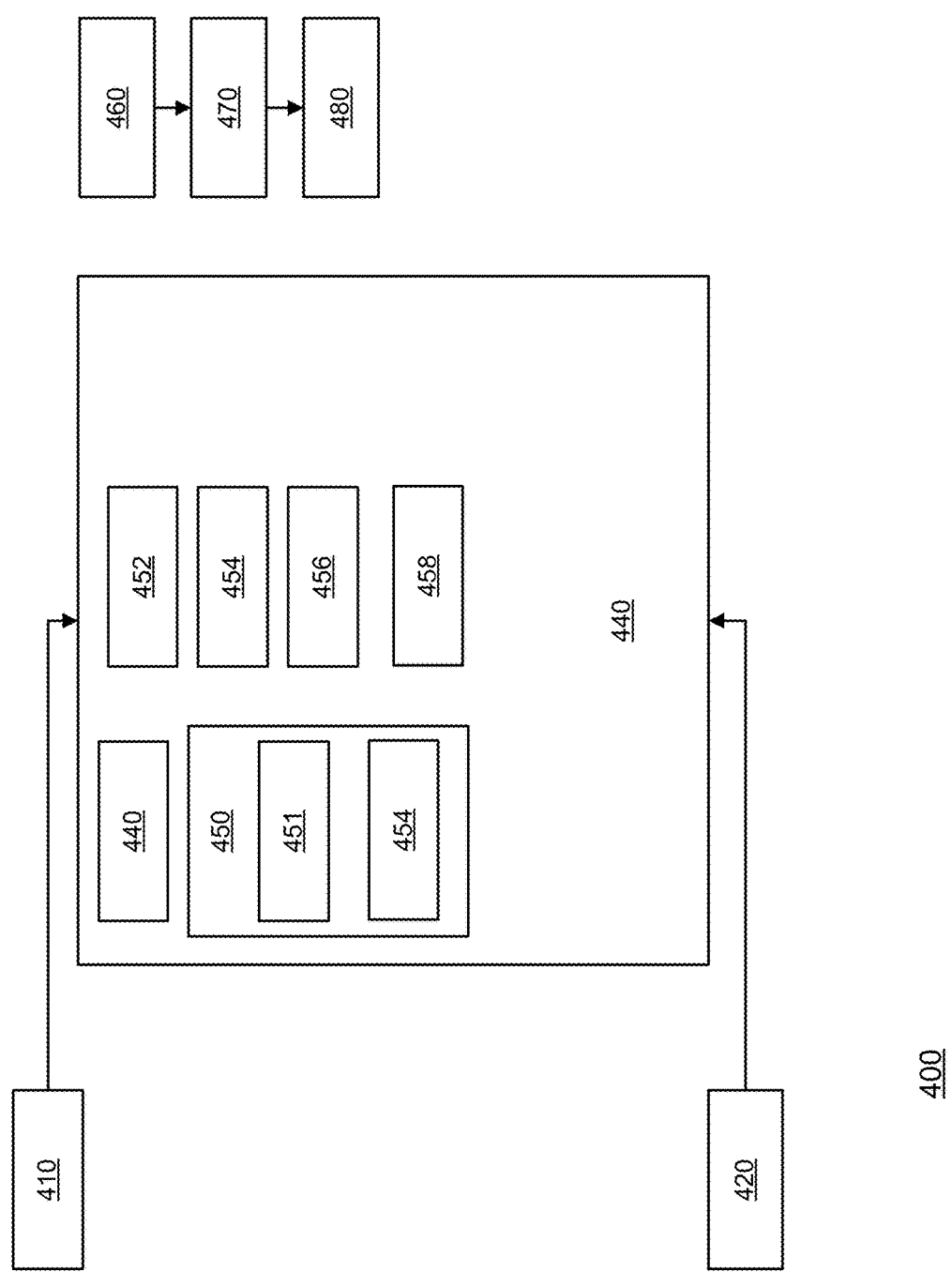
FIG. 14 is an example of a method.

FIG. 14 illustrates an example of a method 400.

Method 400 is for managing a log structured merged (LSM) tree of key value (KV) pairs, the LSM tree is stored in a non-volatile memory.

Method 400 may include step 410 of merging runs of the LSM tree to provide merged runs.

Method 400 may include step 420 of adding new runs to the LSM tree, wherein the adding may include writing runs to the non-volatile memory.

Step 410 and/or step 420 may be followed by step 430 of updating at least one management data structure (MDS) to reflect the merging and the adding.

One MDS of the at least one MDS stores a mapping between keys of the KV pairs of the LSM tree, fingerprints associated with the KV pairs of the LSM tree, and compressed run identifiers that identify runs of the LSM tree.

The compressed run identifiers may be compressed using a variable length code such as but not limited a Huffman code.

Step 430 may include step 440 of compressing run identifiers, by applying a variable length encoding, to provide the compressed run identifiers.

The LSM tree may include a first layer and a last layer. The first layer is smaller than the last layer. There may be a factor T that defines the ration between a layer and a previous layer.

Step 440 may include allocating compressed run identifiers of runs of the last layer that are shorter than compressed run identifiers of runs of the first layer.

Step 430 may include step 450 of calculating combination run identifier codes that represent combination of run identifiers.

The each combination run identifier code is associated with fingerprints of each of the run identifiers the form the combination represented by the combination run identifier.

Method 400 may include step 452 of determining, per layer of the LSM tree, a length of each one of the fingerprints.

Step 454 may include maximizing a sum, over all layers of the LSM tree, or a product of a multiplication of a length of a fingerprint of the layer by a fraction, out of the LSM tree, of the layer.

Step 430 may include step 456 of storing within buckets of the MDS, multiple sets, wherein each set may include a combination run identifier code and fingerprints of each of the run identifiers the form the combination represented by the combination run identifier code. These may provide aligned sets.

Step 430 may include step 458 of storing overflow metadata not included in the buckets in an overflow MDS.

Step 450 may include calculating a compressed combination run identifier codes that represent combination of run identifiers.

Step 450 may include step 451 of imposing constraints of a minimal length of the compressed combination run identifier code.

Step 540 may include step 453 of imposing constraints of a minimal length of a compressed combination run identifier code and determining, per layer of the LSM tree, a length of each one of the fingerprints.

Method 400 may include step 460 of receiving a request to access a requested KV pair stored in the non-volatile memory. The access request may be a request to read the requested KV pair. The KV pair is referred to as a requested KV pair because it is included in the request.

Step 460 may be followed by step 470 of accessing the MDS, using a key of the requested KV pair to obtain a location of a relevant run. This may include obtaining a compressed run ID and decompressing it (decoding it) to provide a non-compressed run ID.

Step 470 may be followed by step 480 of retrieving the relevant run when a relevant run exists. It should be noted that a dedicated value (tombstone) may be allocated for indicating to delete a previous KV pair. When the relevant run includes the key with such dedicated value the response is that the requested KV pair does not exist in the LSM tree.

Step 480 may be followed by waiting to receive a new request and jumping to step 460 when a request is received.

Figure 15:
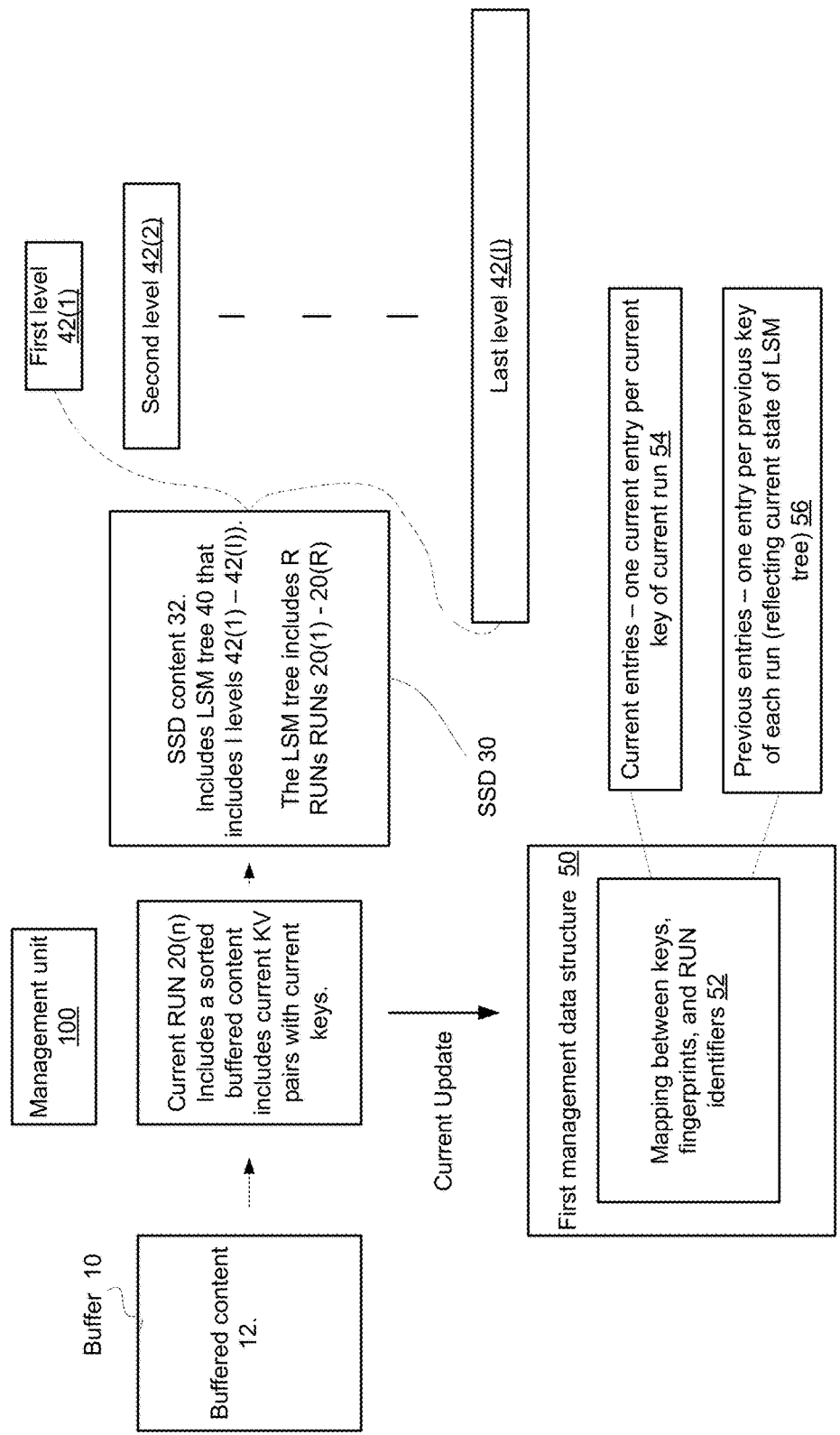
FIG. 15 is an example of a writing a current run and updating a first MDS.

FIG. 15 illustrates a buffer 10, an SSD 30, a first MDS 50, and a management unit 100 for controlling the writing of runs, maintaining the first MDS, and the like. The management unit may be a controller, a processor, may be hosted by the controller and/or the processor and the like.

It is assumed that many runs are generated and sent to the SSD 30. FIG. 15 illustrates the generation and storage of an n'th run, n being an positive integer that may represent an n'th point of time.

Buffer 10 stores buffered content 12.

When the buffer 12 is full (or any other triggering event occurs) a current run 20(n) is send to the SSD 30. The current run 20(n) includes a sorted buffered content includes current KV pairs with current keys.

The SSD stores an SSD content 32. It includes a LSM tree 40 that includes I layers 42(1)-42(I).

At the n'th point of time the LSM tree includes R runs-runs 20(1)-20(R). R is a positive integer. The value of R may change over time.

First MDS 50 stores a mapping between keys, fingerprints and run IDs 52.

Once the current run is written to the SSD the first MDS is updated by adding current entries 54. The First MDS 50 already stores (at the n'th point of time) previous entries-one entry per previous key of each run (reflecting current state of LSM tree).

Figure 16:
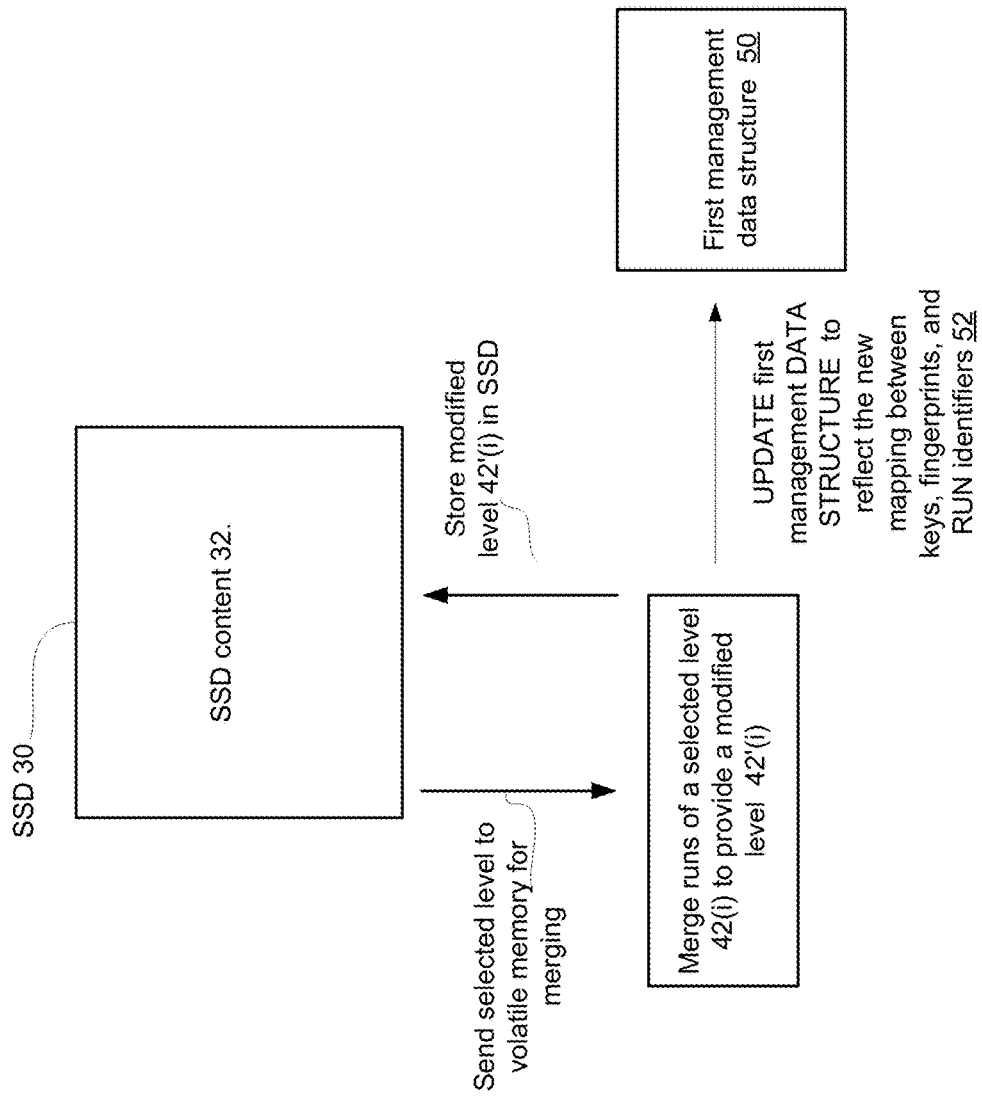
FIG. 16 is an example of a merge operation and updating a first MDS.

FIG. 16 illustrates a merge operation.

Of the SSD content 32—a selected level (or a part of the selected level) of the LSM tree is sent to a volatile memory, a merge operation occurs in which runs of the selected level 42(i) are merged to provide a modified level 42'(i).

The modified level may replace the selected level.

The merging may be executed between runs of multiple levels.

The modification may be executed one part of run (or one part of a level) after the other.

The modification is followed by updating (52) the first MDS 30.

Figure 17:
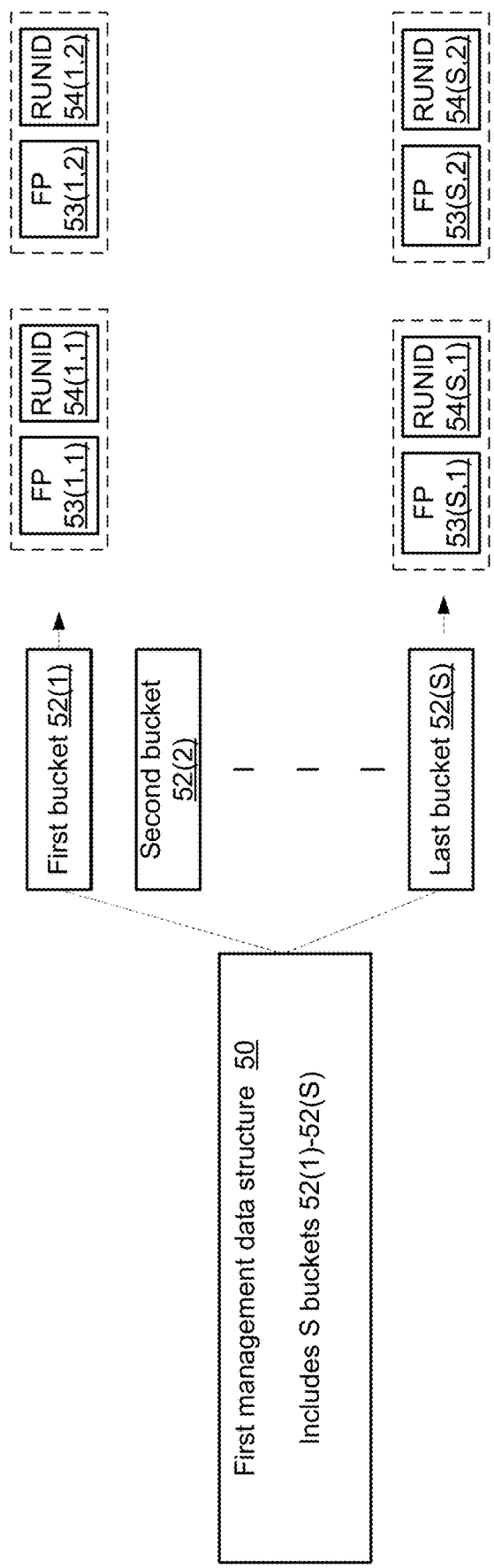
FIG. 17 is an example of a first MDS.

FIG. 17 illustrates the first MDS 50 as including multiple buckets 52(1)-52(S), S being a positive integer.

Each bucket may include one or more sets of a fingerprint and a run ID (RUNID)—see, for example fingerprint FP 53(1,1), run ID 54(1,1), fingerprint FP 53(1,2) and run ID 54(1,2) of first bucket. Yet for another example—see, for example fingerprint FP 53(S,1), run ID 54(S,1), fingerprint FP 53(S,2) and run ID 54(S,2).

The number of sets per bucket may differ from two.

Figure 18:
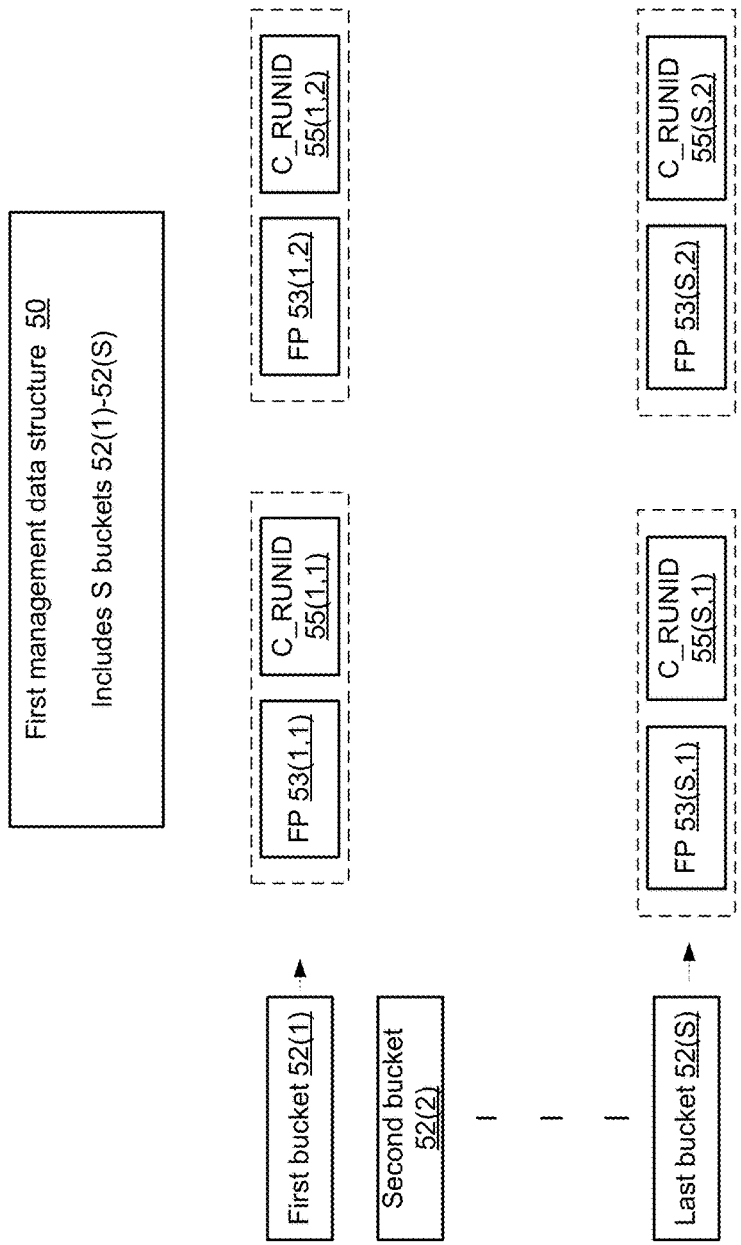
FIG. 18 is an example of a first MDS.

FIG. 18 illustrates the first MDS 50 as including multiple buckets 52(1)-52(S), S being a positive integer.

Each bucket may include one or more sets of a fingerprint and a compressed run ID (C_RUNID)—see, for example fingerprint FP 53(1,1), compressed run ID 55(1,1), fingerprint FP 53(1,2) and compressed run ID 55(1,2) of first bucket. Yet for another example—see, for example fingerprint FP 53(S,1), compressed run ID 55(S,1), fingerprint FP 53(S,2) and compressed run ID 55(S,2).

Figure 19:
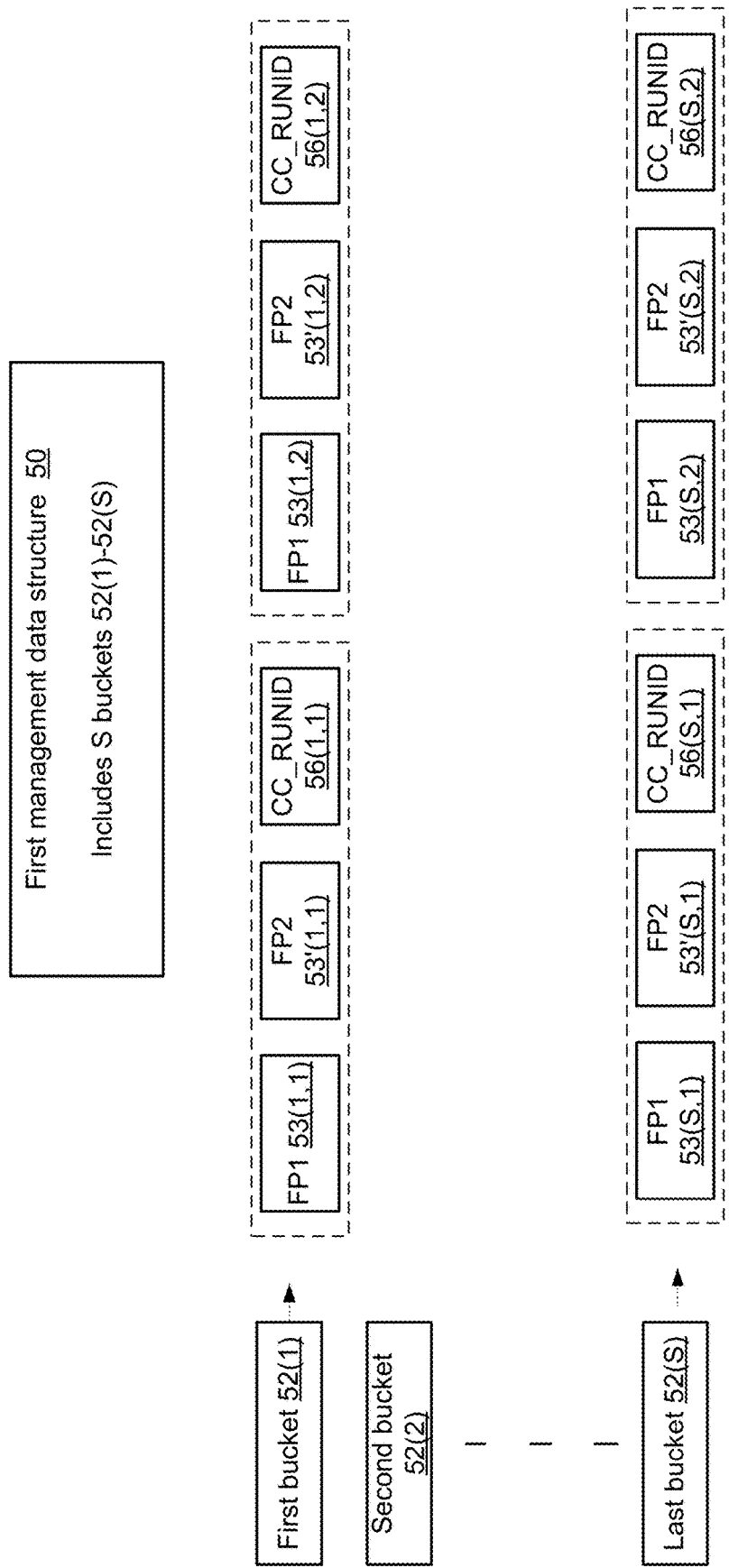
FIG. 19 is an example of a first MDS.

FIG. 19 illustrates the first MDS 50 as including multiple buckets 52(1)-52(S), S being a positive integer.

Each bucket may include one or more sets of fingerprints and a compressed combination run ID (CC_RUNID). A compressed combination run identifier represents combination of run identifiers. Each compressed combination run identifier is associated with fingerprints of each of the run identifiers the form the combination represented by the combination run identifier. The compressed combination run identifier, and these fingerprints form a set.

Each bucket may store multiple sets. See, for example first bucket 52(1) that stores (a) a first set that includes fingerprints FP 53(1,1) and 53'(1,1) and compressed combination run ID 56(1,1)—and (b) a second set that includes fingerprints FP 53(1,2) and 53'(1,2) and compressed combination run ID 56(1,2).

Figure 20:
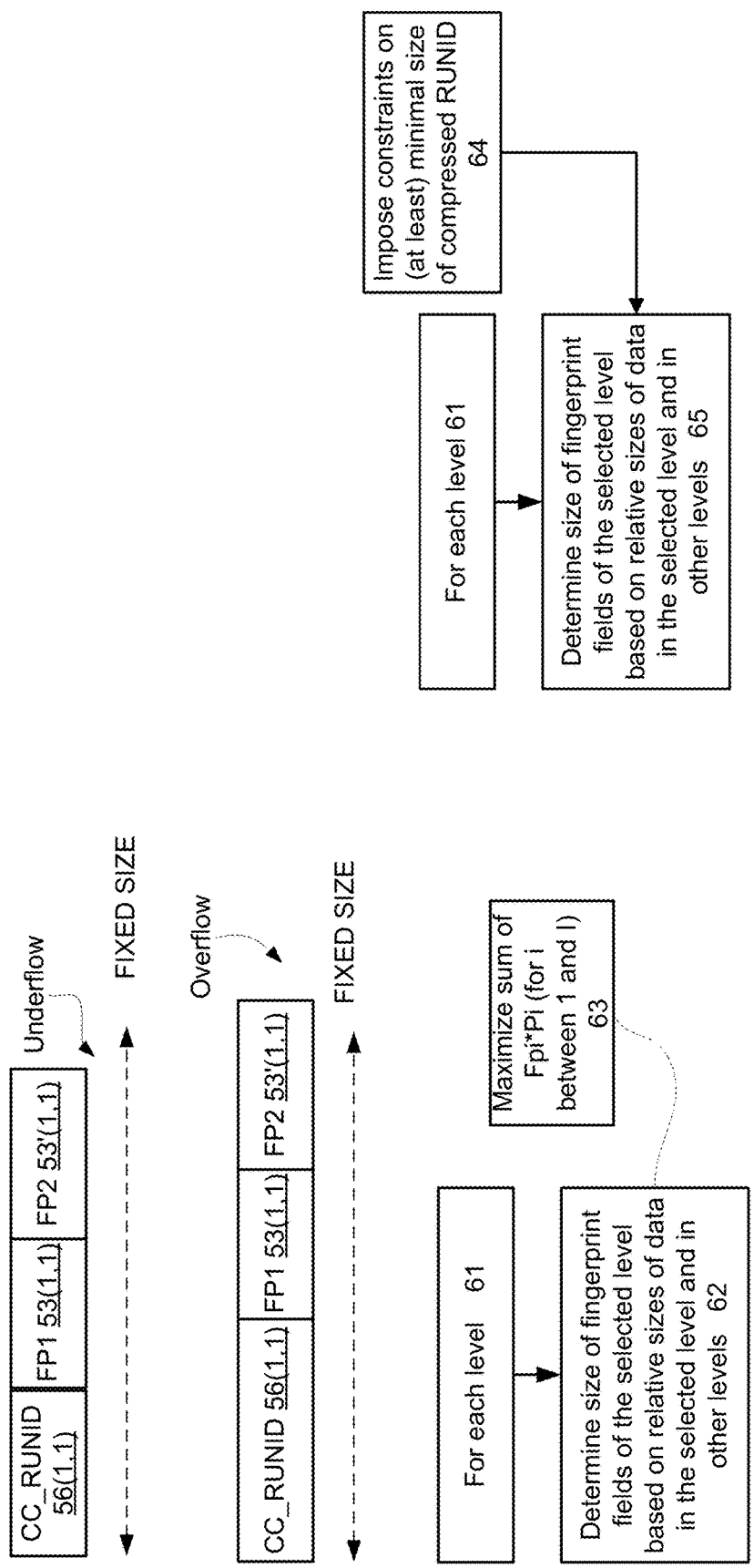
FIG. 20 is an example of a bucket alignment problem and one or more solution for solving the alignment problem.

FIG. 20 illustrates underflows and overflows of sets. A set may include fingerprints FP 53(1,1) and 53'(1,1) and compressed combination run ID 56(1,1). FIG. 20 also illustrates a fixed size allocated per set for alignment purposes.

FIG. 20 also illustrates example of using malleable fingerprinting (steps 61, 62 and 63, and also shows a combination of malleable fingerprinting and fluid alignment coding (steps 61, 64 and 65).

Figure 21:
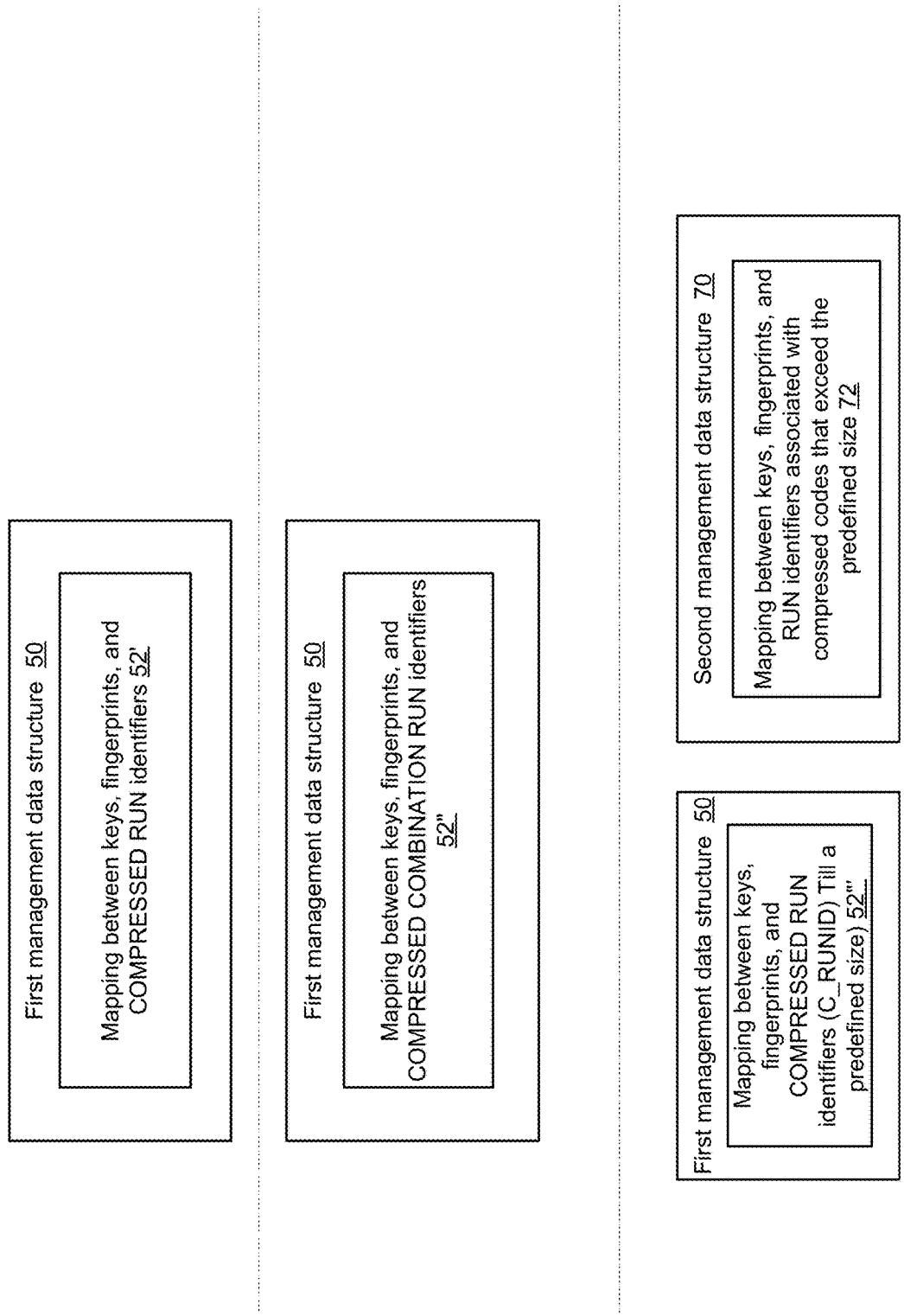
FIG. 21 includes examples of a first MDS and also of a second MDS.
Figure 22:
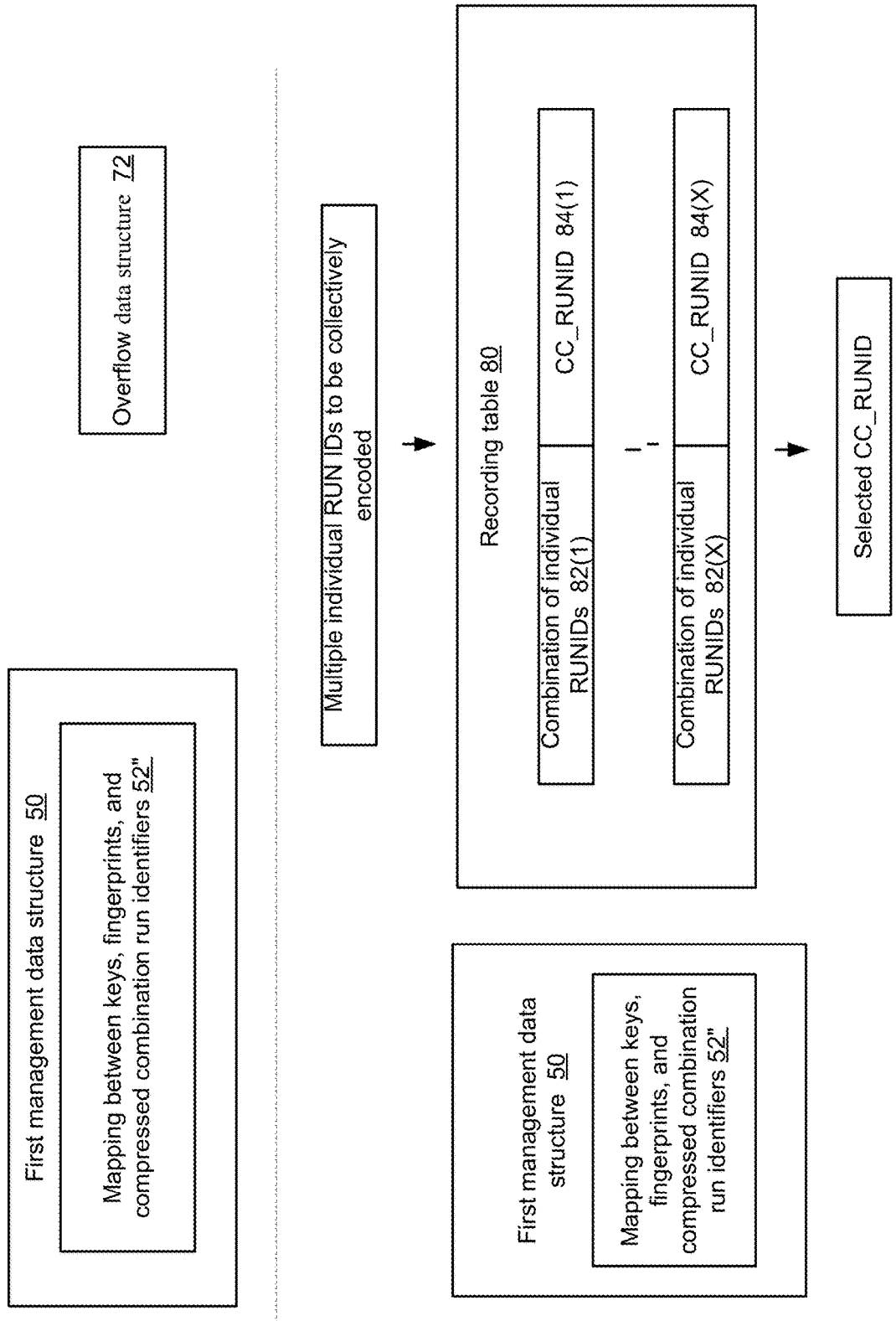
FIG. 22 includes examples of a first MDS and one or more additional MDSs.

FIGS. 21 and 22 illustrates various example of management data structures and their content.

First MDR 50 that stores a mapping 52' between keys, fingerprints and compressed run identifiers.

First MDR 50 that stores a mapping 52" between keys, fingerprints and compressed combination run identifiers.

A combination of first MDR 50 and a second MDR 70 (for example a decoding table). The first MDR 50 may store a mapping 52" between keys, fingerprints and compressed combination run identifiers—but only for compressed combination run identifiers that do not exceed a predefined size. The second MDR stores a mapping between keys, fingerprints and combination run identifiers—but only for combination run identifiers that (in a compressed form) exceed the predefined size.

A combination of a first MDR 50 and an overflow data structure 72. The first MDR 50 may store a mapping 52" between keys, fingerprints and compressed combination run identifiers—but any content that may cause a bucket overflow may be stored in the first overflow data structure 72.

FIG. 22 also illustrates a recording table 80 that maps individual run IDs (fields 82(x)) that should be represented by a single compressed combination run ID and their compressed combination run ID (field 84(x)). Index x ranges between 1 and X, X being the number of entries on recording table 80. X may change over time. The recording table receives a request to determine the compressed combination run ID and outputs the selected CC_RUNID.

The recording table 80 is provided in addition to the first MDR that stores mapping 52".

While the foregoing written description of the invention enables one of ordinary skill to make and use what may be considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for managing a log structured merged (LSM) tree of key value (KV) pairs, the LSM tree is stored in a non-volatile memory, the method comprises:
   merging runs of the LSM tree to provide merged runs;
   writing merged runs to the non-volatile memory;
   adding new runs to the LSM tree, wherein the adding comprises writing runs to the non-volatile memory;
   updating at least one management data structure (MDS) to reflect the merging and the adding; wherein an MDS of the at least one MDS stores a mapping between keys of the KV pairs of the LSM tree, fingerprints associated with the KV pairs of the LSM tree, and compressed run identifiers that identify runs of the LSM tree; and
   compressing run identifiers, by applying a variable length encoding, to provide the compressed run identifiers; wherein the LSM tree comprises a first layer and a last layer, wherein the first layer is smaller than the last layer; wherein the compressing comprises allocating compressed run identifiers of runs of the last layer that are shorter than compressed run identifiers of runs of the first layer.

2. The method according to claim 1 wherein the compressed run identifiers are compressed using a variable length code.

3. The method according to claim 1 comprising calculating combination run identifier codes that represent combination of run identifiers.

4. The method according to claim 3 wherein each combination run identifier code is associated with fingerprints of each of the run identifiers the form the combination represented by the combination run identifier.

5. The method according to claim 4 comprising determining, per layer of the LSM tree, a length of each one of the fingerprints.

6. The method according to claim 5 wherein the determining comprises maximizing a sum, over all layers of the LSM tree, or a product of a multiplication of a length of a fingerprint of the layer by a fraction, out of the LSM tree, of the layer.

7. The method according to claim 4 comprising storing within buckets of the MDS, multiple sets, wherein each set comprises a combination run identifier code and fingerprints of each of the run identifiers the form the combination represented by the combination run identifier code.

8. The method according to claim 7 comprising storing overflow metadata not included in the buckets in an overflow MDS.

9. The method according to claim 1 comprising calculating a compressed combination run identifier codes that represent combination of run identifiers.

10. The method according to claim 9 comprising imposing constraints of a minimal length of the compressed combination run identifier code.

11. The method according to claim 9 comprising imposing constraints of a minimal length of the compressed combination run identifier code and determining, per layer of the LSM tree, a length of each one of the fingerprints.

12. A non-transitory computer readable medium for managing a log structured merged (LSM) tree of key value (KV) pairs, the LSM tree is stored in a non-volatile memory, the non-transitory computer readable medium stores instructions for:
   merging runs of the LSM tree to provide merged runs;
   writing merged runs to the non-volatile memory;
   adding new runs to the LSM tree, wherein the adding comprises writing runs to the non-volatile memory;
   updating at least one management data structure (MDS) to reflect the merging and the adding; wherein an MDS of the at least one MDS stores a mapping between keys of the KV pairs of the LSM tree, fingerprints associated with the KV pairs of the LSM tree, and compressed run identifiers that identify runs of the LSM tree; and
   compressing run identifiers, by applying a variable length encoding, to provide the compressed run identifiers; wherein the LSM tree comprises a first layer and a last layer, wherein the first layer is smaller than the last layer; wherein the compressing comprises allocating compressed run identifiers of runs of the last layer that are shorter than compressed run identifiers of runs of the first layer.

13. The non-transitory computer readable medium according to claim 12 wherein the compressed run identifiers are compressed using a variable length code.

14. The non-transitory computer readable medium according to claim 12 that stores instructions for calculating combination run identifier codes that represent combination of run identifiers.

15. The non-transitory computer readable medium according to claim 14 wherein each combination run identifier code is associated with fingerprints of each of the run identifiers the form the combination represented by the combination run identifier.

16. The non-transitory computer readable medium according to claim 15 that stores instructions for determining, per layer of the LSM tree, a length of each one of the fingerprints.

17. The non-transitory computer readable medium according to claim 16 wherein the determining comprises maximizing a sum, over all layers of the LSM tree, or a product of a multiplication of a length of a fingerprint of the layer by a fraction, out of the LSM tree, of the layer.

18. The non-transitory computer readable medium according to claim 15 that stores instructions for storing within buckets of the MDS, multiple sets, wherein each set comprises a combination run identifier code and fingerprints of each of the run identifiers the form the combination represented by the combination run identifier code.

19. The non-transitory computer readable medium according to claim 18 that stores instructions for storing overflow metadata not included in the buckets in an overflow MDS.

20. The non-transitory computer readable medium according to claim 12 that stores instructions for calculating a compressed combination run identifier codes that represent combination of run identifiers.

21. The non-transitory computer readable medium according to claim 20 that stores instructions for imposing constraints of a minimal length of the compressed combination run identifier code.

22. The non-transitory computer readable medium according to claim 20 that stores instructions for imposing constraints of a minimal length of the compressed combination run identifier code and determining, per layer of the LSM tree, a length of each one of the fingerprints.

23. A device comprising a memory controller and a non-volatile memory unit, the memory controller is configured to manage a log structured merged (LSM) tree of key value (KV) pairs stored in the non-volatile memory unit, the memory controller is configured to manage the LSM tree by:
  merging runs of the LSM tree to provide merged runs;
  writing merged runs to the non-volatile memory;
  adding new runs to the LSM tree, wherein the adding comprises writing runs to the non-volatile memory;
  updating at least one management data structure (MDS) to reflect the merging and the adding; wherein an MDS of the at least one MDS stores a mapping between keys of the KV pairs of the LSM tree, fingerprints associated with the KV pairs of the LSM tree, and compressed run identifiers that identify runs of the LSM tree; and
  compressing run identifiers, by applying a variable length encoding, to provide the compressed run identifiers; wherein the LSM tree comprises a first layer and a last layer, wherein the first layer is smaller than the last layer; wherein the compressing comprises allocating compressed run identifiers of runs of the last layer that are shorter than compressed run identifiers of runs of the first layer.

* * * * *